US012200437B2

(12) United States Patent
Jung et al.

(10) Patent No.: US 12,200,437 B2
(45) Date of Patent: Jan. 14, 2025

(54) SOUND OUTPUTTING APPARATUS

(71) Applicant: SAMSUNG ELECTRONICS CO., LTD., Suwon-si (KR)

(72) Inventors: Donghyun Jung, Suwon-si (KR); Jongbae Kim, Suwon-si (KR); Dongkyu Park, Suwon-si (KR); Sungha Son, Suwon-si (KR); Sungjoo Kim, Suwon-si (KR); Youngsang Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 245 days.

(21) Appl. No.: 17/858,523

(22) Filed: Jul. 6, 2022

(65) Prior Publication Data

US 2022/0337943 A1 Oct. 20, 2022

Related U.S. Application Data

(63) Continuation of application No. PCT/KR2022/003169, filed on Mar. 7, 2022.

(30) Foreign Application Priority Data

Mar. 8, 2021 (KR) ........................ 10-2021-0030427
Jul. 8, 2021 (KR) ........................ 10-2021-0089931

(51) Int. Cl.
*H04R 1/40* (2006.01)
*H04R 1/02* (2006.01)

(52) U.S. Cl.
CPC ............... *H04R 1/40* (2013.01); *H04R 1/023* (2013.01)

(58) Field of Classification Search
CPC .. H04R 1/40; H04R 2499/11; H04R 2499/15; H04R 1/023; H04R 1/2861
See application file for complete search history.

(56) References Cited

U.S. PATENT DOCUMENTS 6,430,297 B1 8/2002 Nakamura
9,749,724 B2 8/2017 Park
(Continued)

FOREIGN PATENT DOCUMENTS

CN 110611864 A 12/2019
JP 4-227198 A 8/1992
(Continued)

OTHER PUBLICATIONS

International Search Report dated Jun. 20, 2022 issued by the International Searching Authority in International Application No. PCT/KR2022/003169 (PCT/ISA/210).
(Continued)

*Primary Examiner* — Sunita Joshi
(74) *Attorney, Agent, or Firm* — Sughrue Mion, PLLC

(57) ABSTRACT

A sound outputting apparatus is provided. The sound outputting apparatus includes a base; a plurality of speakers configured to output sound; and a cover coupled to the base, the cover including a plurality of guide flow paths that respectively correspond to the plurality of speaker. Each of the plurality of guide flow paths includes an outer hole opened in a direction that extends away from the base from a respective one of the plurality of speakers, and further includes a groove that extends in a direction toward a center of the base from the respective one of the plurality of speakers. Each of the plurality of guide flow paths is configured to guide the output sound from the respective one of the plurality of speakers by dividing the output sound into the outer hole of the guide flow path and the groove of the guide flow path.

20 Claims, 24 Drawing Sheets

(56) References Cited

U.S. PATENT DOCUMENTS

| | | | | |
|---|---|---|---|---|
| 10,244,314 | B2 | 3/2019 | Kriegel et al. | |
| 10,327,066 | B2 | 6/2019 | Jung et al. | |
| 10,356,498 | B2 | 7/2019 | Yoon et al. | |
| 10,469,942 | B2 | 11/2019 | Bezzola | |
| 10,499,141 | B2 | 12/2019 | Kim et al. | |
| 10,819,836 | B2 | 10/2020 | Lim et al. | |
| 11,064,290 | B2 | 7/2021 | Son et al. | |
| 2017/0150244 | A1* | 5/2017 | Park | H04R 5/02 |
| 2018/0213319 | A1 | 7/2018 | Qin | |
| 2020/0245062 | A1 | 7/2020 | Son et al. | |

FOREIGN PATENT DOCUMENTS

| | | | |
|---|---|---|---|
| JP | 2000-102082 | A | 4/2000 |
| KR | 10-1066527 | B1 | 9/2011 |
| KR | 10-1510692 | B1 | 4/2015 |
| KR | 10-2017-0060285 | A | 6/2017 |
| KR | 10-2017-0098009 | A | 8/2017 |
| KR | 10-2018-0066923 | A | 6/2018 |
| KR | 10-2019-0040608 | A | 4/2019 |
| KR | 10-1979804 | B1 | 8/2019 |
| KR | 10-2019-0121119 | A | 10/2019 |
| KR | 20190121119 | A * | 10/2019 |
| KR | 10-2020-0119654 | A | 10/2020 |
| KR | 10-2171226 | B1 | 10/2020 |
| WO | 2017/104118 | A1 | 6/2017 |

OTHER PUBLICATIONS

International Written Opinion dated Jun. 20, 2022 issued by the International Searching Authority in International Application No. PCT/KR2022/003169 (PCT/ISA/237).

Communication issued Apr. 17, 2024 by the European Patent Office in European Patent Application No. 22767434.8.

* cited by examiner

1

512

514

516

518

522

SOUND OUTPUTTING APPARATUS

CROSS-REFERENCE TO RELATED APPLICATION(S)

This application is a bypass continuation of International Application No. PCT/KR2022/003169, filed on Mar. 7, 2022, which is based on and claims priority to Korean Patent Application No. 10-2021-0030427, filed on Mar. 8, 2021 and Korean Patent Application No. 10-2021-0089931, filed on Jul. 8, 2021, in the Korean Intellectual Property Office, the disclosures of which are incorporated by reference herein in their entirety.

BACKGROUND

1. Field

The disclosure relates to an audio outputting apparatus and, more specifically, to an audio outputting apparatus including a cover having a plurality of guide flow paths formed therein.

2. Description of Related Art

A sound outputting apparatus is an apparatus having a sound output function for generating and radiating sound waves by vibration of a speaker unit including a vibration plate, and there is a technical need for a sound outputting apparatus that may provide a more abundant and clear sound according to the technology development.

Recently, in various electronic apparatuses having a sound outputting function, a structure design in which an area occupied by a sound outputting module for outputting sound is minimized or a vibration plate of a sound outputting module is not exposed to exterior of the apparatus has been proposed. However, due to the structure of covering the sound outputting module or arranging the sound outputting module inside the apparatus, a problem in which sound quality distortion occurs due to the generation of a reflection sound or an obstacle is generated in the progress of the sound wave and thus, studies to find a structure in which a sound wave is transmitted has been performed to solve the above problem.

Although a slot loading structure for transmitting sound waves using a wave guide is shown in one of these studies, a related-art wave guide structure has a problem in that sound quality is degraded due to the influence of a high-order sound mode inside a slot, and sound waves cannot be uniformly transmitted in all directions.

SUMMARY

Provided is a sound outputting apparatus that has a structure with a slim design, where a speaker unit is not exposed to the outside through a cover including a structure of a plurality of guide flow paths in which a groove is formed and has a frequency characteristic that is flat in all directions of the sound outputting apparatus while minimizing distortion of sound.

In accordance with an aspect of the disclosure, a sound outputting apparatus includes: a base; a plurality of speakers configured to output sound; and a cover coupled to the base, the cover including a plurality of guide flow paths that respectively correspond to the plurality of speaker, wherein each of the plurality of guide flow paths includes an outer hole opened in a direction that extends away from the base from a respective one of the plurality of speakers, and a groove that extends in a direction toward a center of the base from the respective one of the plurality of speakers, and wherein each guide flow path, from among the plurality of guide flow paths, is configured to guide the output sound from the respective one of the plurality of speakers by dividing the output sound into the outer hole of the guide flow path and the groove of the guide flow path.

At least one of the plurality of guide flow paths extends from an inner side of the base toward an outer side of the base.

Across section of the at least one of the plurality of guide flow paths increases toward the outer side of the base.

According to an embodiment, the cross section of the at least one of the plurality of guide flow paths increases at an increasing rate from the inner side of the base toward the outer side of the base, such that the at least one of the plurality of guide flow paths has a horn shape.

According to an embodiment, the cross section of the at least one of the plurality of guide flow paths increases at an decreasing rate from the inner side of the base toward the outer side of the base, such that the at least one of the plurality of guide flow paths has an inverse-horn shape.

According to an embodiment, each of the plurality of guide flow paths has a same structure.

According to an embodiment, the groove includes at least one inner hole which is opened so as to be configured to transfer a portion of the output sound that is guided to the groove to an outside of the guide flow path that includes the groove.

According to an embodiment, the at least one inner hole includes an inner hole that is opened downward so as to be configured to guide at least a part of the portion of the output sound in a direction toward the base.

According to an embodiment, the at least one inner hole includes an inner hole that is opened upward so as to be configured to guide at least a part of the portion of the output sound to an upper portion of the cover.

According to an embodiment, the at least one inner hole is a plurality of inner holes formed in the groove.

According to an embodiment, at least one of the plurality of guide flow paths includes a soundproof module disposed inside the groove of the at least one of the plurality of guide flow paths.

According to an embodiment, at least one of the plurality of guide flow paths includes a noise cancellation device disposed inside the groove of the at least one of the plurality of guide flow paths.

According to an embodiment, the groove of a first guide flow path, among the plurality of guide flow paths, includes an inner hole that is configured to guide a portion of the output sound, from a first speaker among the plurality of speakers, that is guided toward the center of the base to the groove of a second guide flow path among the plurality of guide flow paths.

According to an embodiment, the sound outputting apparatus further includes a phase conversion module, provided between the first guide flow path and the second guide flow path, configured to convert the portion of the output sound guided toward the center of the base to an inverse phase.

According to an embodiment, the first guide flow path and the second guide flow path are symmetrical to each other with respect to the center of the base.

In accordance with an aspect of the disclosure, a sound outputting apparatus includes: a base; at least one speaker configured to output sound, the at least one speaker provided on an end of the base in a first direction that coincides with a center axis of the base; and a cover that is coupled to the end of the base, the at least one speaker between the base and the cover in the first direction, the cover defining at least one guide flow path that respectively corresponds to the at least one speaker. Each of the at least one guide flow path includes: an outer hole opened in a second direction, that is perpendicular to the first direction and extends away from the center axis of the base from a respective one of the at least one speaker, and a groove that extends in a third direction, that is perpendicular to the first direction and extends toward the center axis of the base from the respective one of the at least one speaker. Each guide flow path, from among the at least one guide flow path, is configured to guide the output sound from the respective one of the at least one speaker by dividing the output sound into the outer hole of the guide flow path and the groove of the guide flow path.

According to an embodiment, the at least one speaker is a plurality of speakers and the at least one guide flow path is a plurality of guide flow paths, the plurality of speakers are arranged symmetrically around the center axis of the base, and the plurality of guide flow paths are arranged symmetrically around the center axis of the base.

According to an embodiment, the at least one guide flow path extends in the second direction and the third direction, from a position directly above the at least one speaker in the first direction.

According to an embodiment, a cross section of the at least one guide flow path increases in the second direction that extends away from the center axis of the base.

According to an embodiment, the groove includes at least one inner hole which is opened so as to be configured to transfer a portion of the output sound that is guided to the groove to an outside of the guide flow path that includes the groove.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
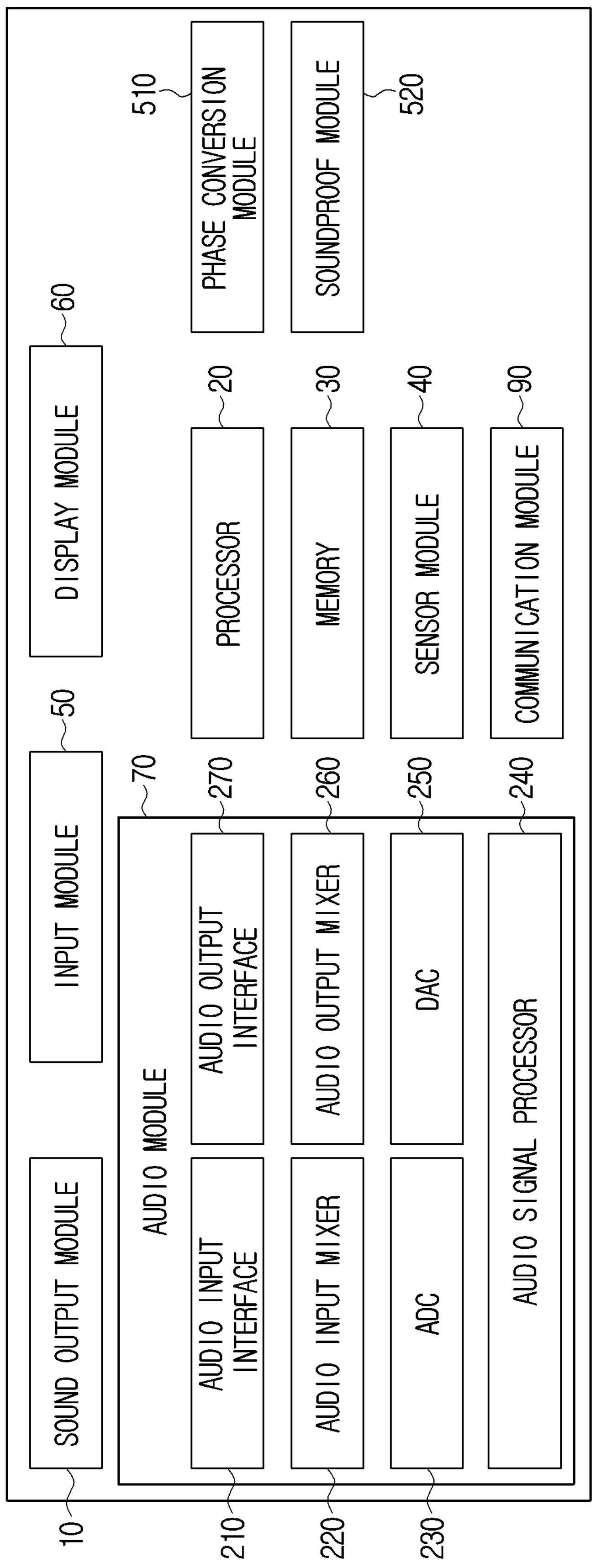
FIG. 1 is a block diagram of a sound outputting apparatus according to an embodiment of the disclosure.

The terminology used herein will be briefly described, and non-limiting example embodiments of the disclosure will be described in detail. In the description of the disclosure, a detailed description of related known arts may be omitted, and redundant descriptions of configurations may be omitted.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

Since embodiments of the present disclosure may be variously modified and may include several embodiments, specific non-limiting example embodiments of the disclosure will be illustrated in the drawings and be described in detail in the detailed description. However, it is to be understood that the disclosure is not limited to specific non-limiting example embodiments, but includes all modifications, equivalents, and substitutions without departing from the scope and spirit of the disclosure. A detailed description of known configurations related to the disclosure may be omitted so as not to obscure the gist of the disclosure.

It is to be understood that the various embodiments of the document and the terms used therefor are not intended to limit the technical features set forth in the present document to particular embodiments, and should be understood to include various changes, equivalents, or substitutes of this embodiment. In connection with the description of the drawings, similar or related components may be used with similar reference numerals. The singular forms of the noun corresponding to the item may include one or more of the items unless explicitly indicated otherwise. In this document, phrases such as “A or B”, “at least one of A and B”, “at least one of A or B”, “at least one of A, B or C”, and “at least one of A, B, and C” may include any one of the items listed together in the corresponding phrases of the phrase, or all possible combinations thereon. Terms such as “first”, “second”, or “first” or “second” may simply be used to distinguish the component from other such components, and the components are not limited to other aspects (e.g., importance or order). If any (e.g., first) component is referred to as “coupled” or “connected” to another (e.g., second) component, with or without the term “functionally” or “communicatively”, it means that the component may be connected directly to the other components (e.g., wired), wirelessly, or through a third component.

In addition, expressions “first”, “second”, or the like, used in the disclosure may indicate various components, may be used to distinguish one component from the other components, and do not limit the corresponding components. For example, the first component may be named the second component and the second component may also be similarly named the first component, without departing from the scope of the disclosure.

A singular expression includes a plural expression, unless otherwise specified. It is to be understood that terms such as “comprise” or “include” are used herein to designate a presence of a characteristic, number, step, operation, element, component, or a combination thereof, and not to preclude a presence or a possibility of adding one or more of other characteristics, numbers, steps, operations, elements, components or a combination thereof.

A term such as “module,” “unit,” and “part,” is used to refer to an element that performs at least one function or operation and that may be implemented as hardware or software, or a combination of hardware and software. Except when each of a plurality of “modules,” “units,” “parts,” and the like must be realized in an individual hardware, the components may be integrated in at least one module or chip and be realized in at least one processor.

The term “module” used in the disclosure includes units comprising or consisting of hardware, software, or firmware, and is used interchangeably with terms such as, for example, logic, logic blocks, parts, or circuits. A “unit” or “module” may be an integrally constructed component or a minimum unit or part thereof that performs one or more functions. For example, the module may be configured as an application-specific integrated circuit (ASIC).

Hereinafter, with reference to the attached drawings, embodiments will be described in detail so that those skilled in the art to which the disclosure belongs to can easily make and use the embodiments. However, embodiments of the present disclosure may be implemented in various different forms and are not limited to the example embodiments described herein.

Sound outputting apparatuses of the disclosure will be described in detail with reference to FIGS. 1 to 17.

FIG. 1 is a block diagram of a sound outputting apparatus 1 according to an embodiment of the disclosure.

Referring to FIG. 1, a sound outputting apparatus 1 according to an embodiment of the disclosure may include an audio outputting module 10 and an audio module 70 to output sound. According to an embodiment, the sound outputting apparatus 1 may include a processor 20, a memory 30, an input module 50, a display module 60, a sensor module 40, a communication module 90, a phase conversion module 510, and/or a soundproof module 520.

The sound outputting apparatus 1 may be an electronic apparatus that has a sound output function, and may be, for example, a speaker for sound output, but may be various types of electronic apparatuses. For example, the sound outputting apparatus 1 may include a portable communication device (e.g., a smartphone), a TV, a computer device, a portable multimedia device, a beam projector, a portable medical device, a camera, a wearable device, a radio, or a home appliance, and according to various embodiments of the disclosure, the sound outputting apparatus 1 is not limited to the above-described devices.

The sound outputting module 10 may output a sound signal to the outside of the sound outputting apparatus 1. The sound outputting module 10 may include, for example, one or more speaker units 110 (e.g., one or more speakers), such as a dynamic driver or a balanced armature driver, or a receiver.

The speaker unit 110 may be used for general purpose, such as multimedia reproduction or recording reproduction. According to an embodiment, the sound outputting module 10 may include a plurality of the speaker unit 110. In this case, the audio output interface 270 may output an audio signal having a plurality of different channels (e.g., stereo, or 5.1 channel) via at least some of the speaker unit 110.

The input module 50 may receive commands or data to be used for components (e.g., the processor 20) of the sound outputting apparatus 1 from the outside (e.g., user) of the sound outputting apparatus 1. The input module 50 may include, for example, a microphone, a mouse, a keyboard, a key (e.g., a button), or a digital pen (e.g., a stylus pen).

The display module 60 may visually provide information to an external (e.g., user) of the sound outputting apparatus 1. The display module 60 may include, for example, a display, a hologram device, a projector, or a control circuit for controlling the corresponding device, and the display module 60 of one embodiment may include a touch sensor configured to sense a touch, or a pressure sensor configured to measure the intensity of force generated by the touch.

The audio module 70 may convert a sound into an electrical signal or convert the electrical signal to sound. According to one embodiment, the audio module 70 may obtain sound through the input module 50, or may output sound through an external electronic device (e.g., speaker or headphone) directly or wirelessly connected to the sound output module 10 or the sound outputting apparatus 1.

The audio module 70 may include, for example, an audio input interface 210, an audio input mixer 220, an analog to digital converter (ADC) 230, an audio signal processor 240, a digital to analog converter (DAC) 250, an audio output mixer 260, and/or an audio output interface 270. Hereinafter, the operation of the plurality of configurations included in the audio module 70 and the operation of the sound outputting module 10 in the sound outputting apparatus 1 including the sound output module 10 and the input module 50 will be described in detail.

The audio input interface 210 may receive an audio signal corresponding to a sound obtained from the outside of the sound outputting apparatus 1 through a microphone (e.g., a dynamic microphone, a condenser microphone, or a piezo-microphone) as a part of the input module 50 or separately configured. For example, when an audio signal is obtained from an external electronic device (e.g., a headset or a microphone), the audio input interface 210 may be connected to the external electronic device via a connection terminal directly or wirelessly (e.g., Bluetooth communication) via the communication module 90 to receive an audio signal. According to an embodiment, the audio input interface 210 may receive a control signal (e.g., a volume adjustment signal received via an input button) associated with an audio signal obtained from the external electronic device.

The audio input interface 210 includes a plurality of audio input channels and may receive different audio signal for each corresponding audio input channel among the plurality of audio input channels. According to one embodiment, additionally or alternatively, the audio input interface 210 may receive an audio signal from another component of the sound outputting apparatus 1 (e.g., the processor 20 or the memory 30).

The audio input mixer 220 may mix the plurality of input audio signals to at least one audio signal. For example, according to one embodiment, the audio input mixer 220 may mix the plurality of analog audio signals input via the audio input interface 210 into at least one analog audio signal.

The ADC 230 may convert the analog audio signal into a digital audio signal. For example, according to one embodiment, the ADC 230 may convert the analog audio signal received via the audio input interface 210, or additionally or alternatively, convert the mixed analog audio signal via the audio input mixer 220 into a digital audio signal.

The audio signal processor 240 may perform various processing on the digital audio signal received through the ADC 230, or the digital audio signal received from other components of the sound outputting apparatus 1. For example, according to one embodiment, the audio signal processor 240 may perform sampling rate modification, one or more filter application, interpolation processing, amplification or attenuation of entire or partial frequency bandwidth, noise processing (e.g., noise or echo attenuation), channel change (e.g., mono and stereo conversion), mixing, or designated signal extraction for one or more digital audio signals. According to one embodiment, one or more functions of the audio signal processor 240 may be implemented in the form of an equalizer.

The DAC 250 may convert the digital audio signal into an analog audio signal. For example, according to one embodiment, the DAC 250 may convert a digital audio signal processed by the audio signal processor 240, or the digital audio signal obtained from other components of the sound outputting apparatus 1 (e.g., the processor 20 or memory 30) into an analog audio signal.

The audio output mixer 260 may mix the plurality of audio signals to be output into at least one audio signal. For example, according to one embodiment, the audio output mixer 260 may mix the audio signal converted to an analog signal via the DAC 250 and other analog audio signals (e.g., the analog audio signal received via the audio input interface 210) into at least one analog audio signal.

The audio output interface 270 may output the analog audio signal converted through the DAC 250, or additionally or alternatively, convert the analog audio signal mixed by the audio output mixer 260 to the outside of the sound outputting apparatus 1 via the sound output module 10.

According to an embodiment of the disclosure, the audio module 70 may not include the audio input mixer 220 or the audio output mixer 260, and may mix the plurality of digital audio signals using at least one function of the audio signal processor 240 to generate at least one digital audio signal.

According to an embodiment, the audio module 70 may include an audio amplifier (not shown) (e.g., a speaker amplification circuit) capable of amplifying an analog audio signal input via the audio input interface 210, or an audio signal to be output via the audio output interface 270. According to an embodiment, the audio amplifier may be composed of a module separate from the audio module 70.

The processor 20 may control the at least one another component (e.g., hardware or software component) of the sound outputting apparatus 1 connected to the processor 20 by executing the software and perform various data processing or operation. According to an embodiment, as at least a part of the data processing or operation, the processor 20 may load the command or data received from another component (e.g., the sensor module 40 or the communication module 90) to a volatile memory, process a command or data stored in the volatile memory, and store the result data in a non-volatile memory.

The memory 30 may store various data used by at least one component (e.g., processor 20 or sensor module 40) of the sound outputting apparatus 1. The data may include, for example, software and input data or output data related with software instructions. The memory 30 may include the volatile memory or non-volatile memory.

The sensor module 40 may detect the operation state of the sound outputting apparatus 1 (e.g., power or temperature), or an external environment state (e.g., a user state), and generate an electrical signal or a data value corresponding to the detected state. According to an embodiment, the sensor module 40 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The communication module 90 may support establishing a direct (e.g., wired) communication channel or a wireless communication channel between the sound outputting apparatus 1 and the external electronic device and may further support communication over the established communication channel. The communication module 90 may include one or more communication processors operating independently of the processor 20 and supporting direct (e.g., wired) communication or wireless communication.

According to an embodiment, the communication module 90 may include a wireless communication module (e.g., a cellular communication module, a local area wireless communication module, or a global navigation satellite system (GNSS) communication module) or a wired communication module (e.g., a local area network (LAN) communication module, or a power line communication module). The wireless communication module may support a 5G network, 4G network, and a next generation communication technology, e.g., new radio (NR) access technology.

According to various embodiments, one or more of the aforementioned components or operations may be omitted, or one or more other components or operations may be added. Alternatively or additionally, a plurality of components (e.g., modules or programs) may be integrated into one component. In this case, the integrated component may perform one or more functions of each of the plurality of components as being performed by the corresponding component of the plurality of components prior to the integration.

Operations performed by a module, program, or other element, in accordance with various embodiments, may be performed sequentially, in a parallel, repetitive, or heuristically manner, or at least some operations may be performed in a different order, or at least one other operations may be added.

According to various embodiments of the disclosure, the sound outputting apparatus 1 may have a structure that includes a cover 120 including a plurality of the guide flow path 130, so that the sound quality degradation may be minimized by having a frequency characteristic that is flat in all directions in the sound outputting apparatus 1 of a slim design or a hidden design. Hereinafter, the sound outputting apparatus 1 will be described in detail with reference to the drawings.

Figure 2:
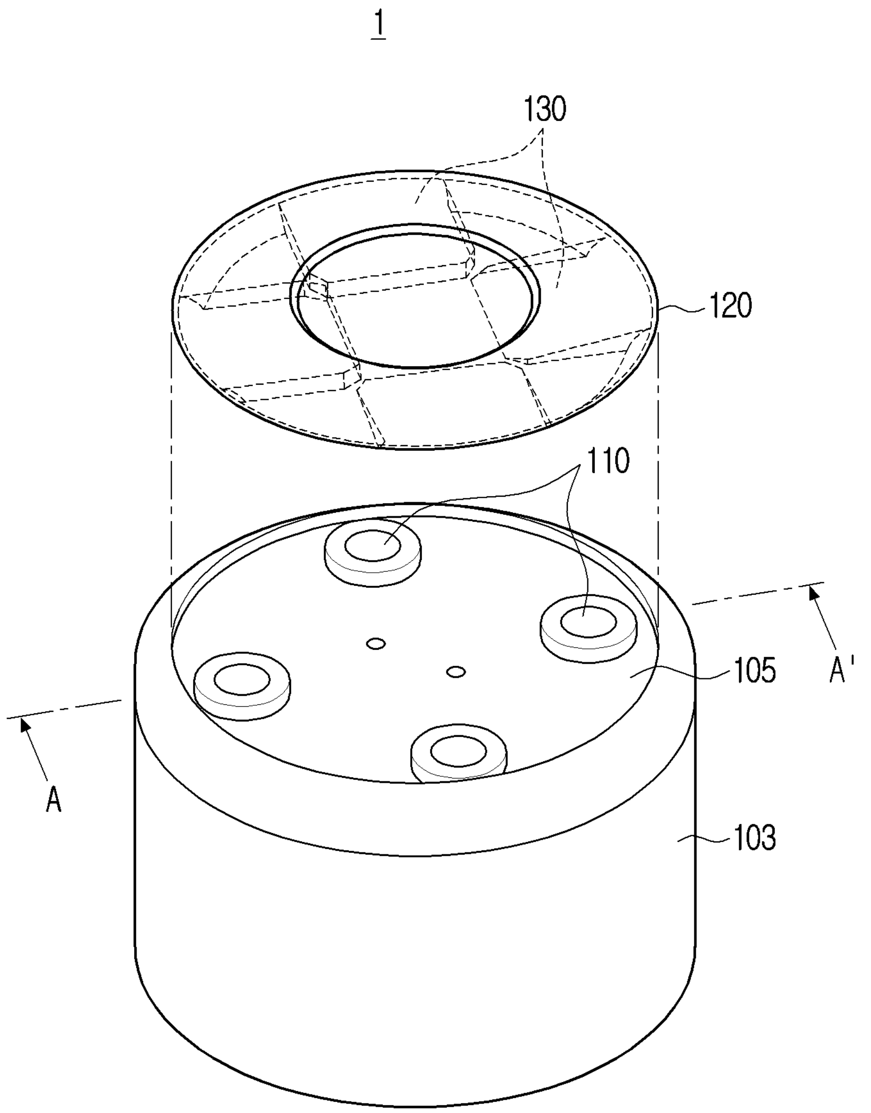
FIG. 2 is a perspective view illustrating a sound outputting apparatus according to an embodiment of the disclosure.

FIG. 2 is a perspective view illustrating a sound outputting apparatus 1 according to an embodiment of the disclosure.

Referring to FIG. 2, the sound outputting apparatus 1 may include a base 105, one or more speaker units 110, and a cover 120.

The base 105 is a main body forming the exterior of the sound outputting unit, and a component of the sound outputting apparatus 1 described above may be embedded in the base 105. The sound outputting apparatus 1 may include a case 103 surrounding the outer circumferential surface of the base 105 and the cover 120 coupled to the base 105.

The outer shape of the base 105 may have a cylindrical structure as shown in FIG. 2, but is not limited thereto, and may have various three-dimensional structures, such as a pillar having a polygonal cross-section or a polygon. The speaker unit 110 may be disposed on an upper surface of the base 105 to output sound from the upper surface of the base 105.

The outer shape of the base 105 according to various embodiments may have a spherical shape, and in this case, the speaker unit 110 may be symmetrically disposed on the outer circumferential surface of the base 105, and the cover 120 may surround the outer circumferential surface of the base 105, and the sound outputting apparatus 1 may output sound in all directions. Hereinafter, for convenience, the structure of the sound outputting apparatus 1 will be described based on the base 105 having a pillar shape and of which the upper surface of the base 105 has a circular shape.

The speaker unit 110 is a configuration of the sound output module 10 that is configured to output sound, and the sound outputting module 10 may include a plurality of the speaker unit 110. The plurality of the speaker unit 110 may be driven by the audio module 70. The plurality of the speaker unit 110 may be symmetrically disposed on the base 105 to output sound, and the plurality of the speaker unit 110 according to an embodiment may be symmetrically arranged with respect to the center of the base 105.

For example, when the speaker unit 110 is disposed on the upper surface of the base 105 having the column structure shown in FIG. 2, the plurality of the speaker unit 110 may be symmetrically arranged with reference to the center of the upper surface of the base 105. When the base 105 of one embodiment is spherical, the plurality of the speaker unit 110 may be symmetrically disposed on the outer circumferential surface of the base 105 with respect to the center of the sphere.

The number of the plurality of the speaker unit 110 is not restricted, and the plurality of the speaker unit 110 may be symmetrically arranged in a 360-degree direction based on the upper surface of the base 105. For example, when there are two of the speaker unit 110, each of the speaker unit 110 may be disposed in an opposite direction with respect to the center of the base 105, and when there are three of the speaker unit 110, each of the plurality of the speaker unit 110 may be spaced at 120 degrees from the center of the base 105 and symmetrically disposed in a 360-degree direction.

The cover 120 may be coupled to the outer surface of the base 105, such as at an area where a plurality of the speaker unit 110 are disposed on the outer surface of the base 105. The cover 120 is coupled to the base 105 to prevent the plurality of the speaker unit 110 from being exposed to the outside. The sound outputting apparatus 1 including the cover 120 may implement a slim design or a hidden design by covering the vibration plate of the plurality of the speaker unit 110 so that the vibration plate of the plurality of the speaker unit 110 is not visible to the outside.

The cover 120 may prevent foreign substances such as water and dust from being introduced into the plurality of the speaker unit 110, and prevent the vibration plate from being damaged, and the exterior of the sound outputting apparatus 1 may be perceived by a user to have unity and aesthetic effect by the vibration plate of the plurality of the speaker unit 110 being covered to not to be visible to the outside. In the sound outputting apparatus 1 including the display module 60, the sound outputting apparatus 1 may be configured to cover the plurality of the speaker unit 110 so as not to be visible to the exterior through the cover 120, wherein the plurality of the speaker unit 110 are disposed inside the sound outputting apparatus 1, thereby securing an area in which the display screen may occupy.

The cover 120 may include a plurality of a guide flow path 130 coupled to the base 105 to correspond to each of the plurality of the speaker unit 110. The plurality of the guide flow path 130 may be formed to correspond to the number and arrangement structure of the plurality of the speaker unit 110, and may guide the output sound outputted from the plurality of the speaker unit 110 in an outside direction of the cover 120.

Figure 3A:
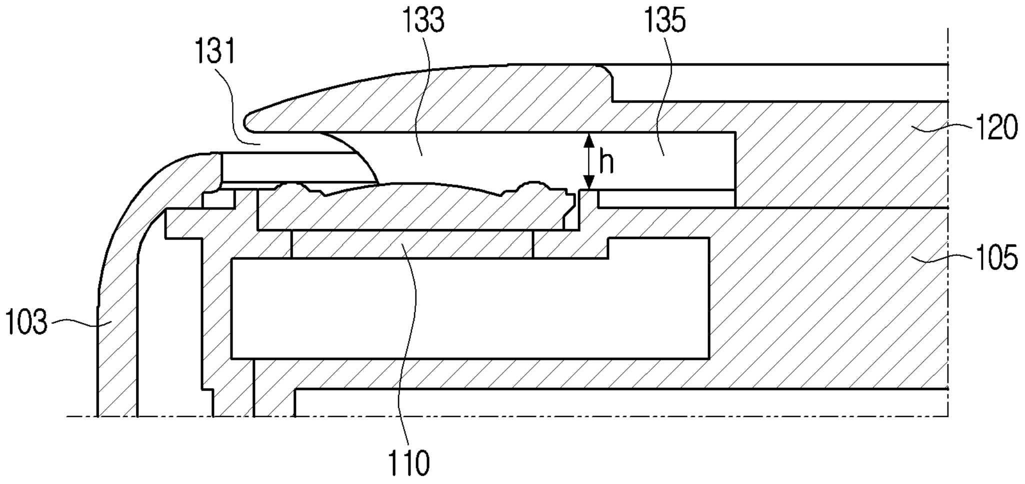
FIG. 3A is a cross-sectional view illustrating a portion of a sound outputting apparatus according to an embodiment of the disclosure.

FIG. 3A is a cross-sectional view illustrating a portion of a sound outputting apparatus 1 according to an embodiment of the disclosure.

Figure 3B:
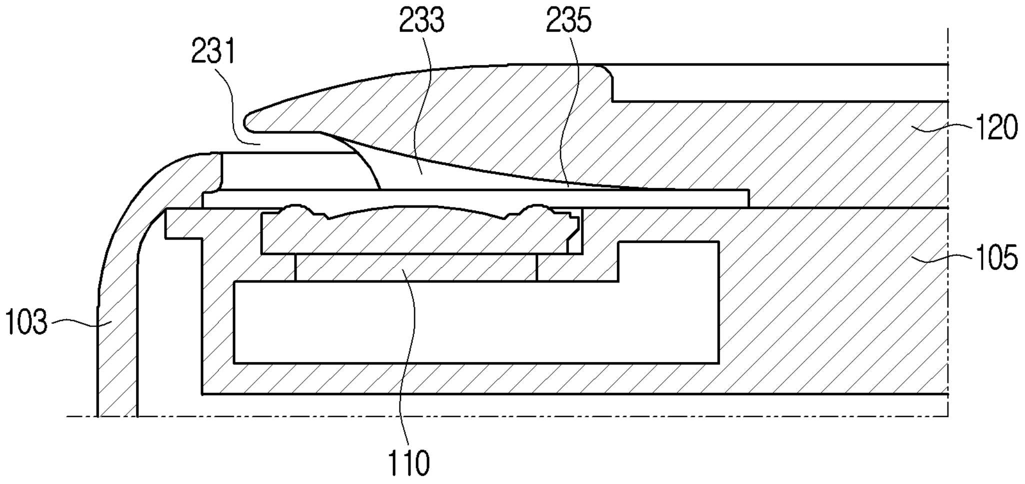
FIG. 3B is a cross-sectional view of a portion of a sound outputting apparatus according to an embodiment of the disclosure.
Figure 3C:
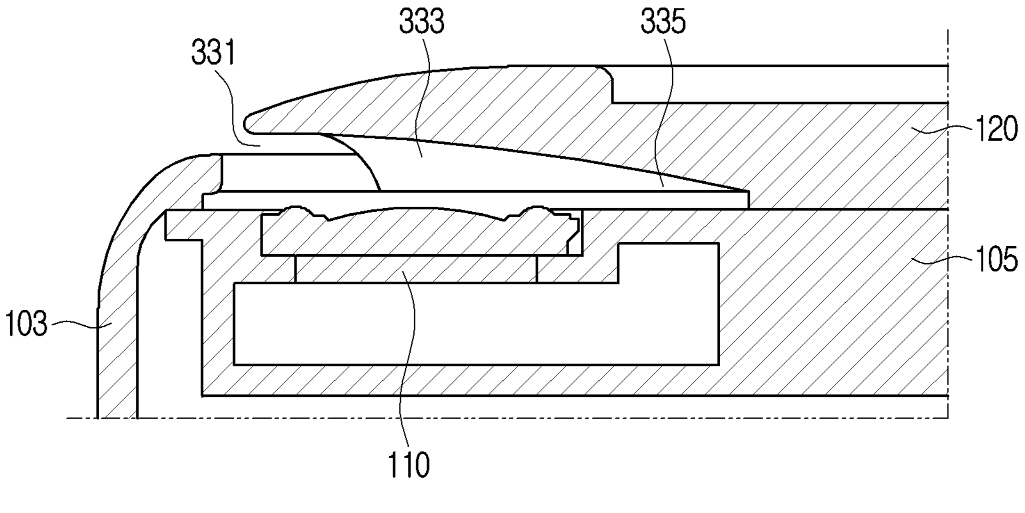
FIG. 3C is a cross-sectional view illustrating a portion of a sound outputting apparatus according to an embodiment of the disclosure.

More specifically, FIGS. 3A to 3C are diagrams illustrating a partial area of a cross section which cuts the sound outputting apparatus 1 of various embodiments in a direction of A-A' of FIG. 2.

Referring to FIG. 3A, the guide flow path 130 according to an embodiment of the disclosure may include an outer hole 131, a guide portion 133, and a groove 135.

The guide flow path 130 may be formed by coupling the cover 120 to the base 105, and the guide flow path 130 may be a waveguide for guiding an output sound emitted from the speaker unit 110. The guide flow path 130 may include the outer hole 131, the guide portion 133, and the groove 135, each of which is divided according to a role of guiding an output sound, and in an actual implementation, the guide flow path 130 may have a single flow path structure of which at least one side is opened. The guide flow path 130, disposed on the front surface of the speaker unit 110 for guiding toward the side portion, may have a function of a low pass filter, but the guide flow path 130 of various embodiments of the disclosure may improve the sound quality of the high-order area through a structure design which will be described later.

The outer hole 131 may be an opening through which the output sound of the speaker unit 110 passes through the guide flow path 130 and is discharged to the outside of the sound outputting apparatus 1. As shown in FIG. 3A, the outer hole 131 may be implemented as a gap between the outer surface of the cover 120 and the case 103 or the base 105, or may be implemented as an opening passing through the cover 120.

The size and shape of the outer hole 131 may be determined by the cover 120, the base 105, or the shape of the case 103. The outer hole 131 may be opened from the speaker unit 110 in a direction away from the base 105, and the respective outer hole 131 of each of the plurality of the guide flow path 130 may be symmetrically disposed so that the sound of the sound outputting apparatus 1 may be uniformly emitted in the outer 360-degree direction of the base 105.

The guide portion 133 is an area facing the speaker unit 110 among parts of the guide flow path 130, and may guide the output sound outputted from the speaker unit 110 in the direction toward the outer hole 131 and the groove 135. In this case, the output sound may be divided and a portion of the output sound guided in the direction of the outer hole 131 may be referred to as a front sound, and a portion of the output sound guided in the direction of the groove 135 may be referred to as a rear sound. The guide portion 133 may have various structures and materials so as to correspond to the radiation structure of the speaker unit 110, and the sound characteristics of the front sound may vary depending on the overall structure of the guide flow path 130.

The groove 135 is an area that may extend from the speaker unit 110 toward the center of the base 105 from the speaker unit 110, and may be formed in the opposite direction of the outer hole 131 around the guide portion 133.

The groove 135 may receive a rear sound from the guide portion 133. The guide flow path 130 including the groove 135 may implement a low-pass filter function to guide the output sound in the lateral direction, thereby improving the sound quality of the high bandwidth of the sound outputting apparatus 1.

The structure of the guide flow path 130 including the groove 135 may be embodied in a diverse manner. As shown in FIG. 3A, the guide flow path 130 may extend toward a center of the base 105 where the groove 135 is located, and toward a direction away from the base 105 where the outer hole 131 is located. The cross-sectional area of the guide flow path 130 may be kept constant, or the height h of the guide flow path 130 may be kept constant or uniform, or the upper surface structure of the cover 120 may be flat. The height h of the guide flow path 130 may affect the sound quality of the sound outputting apparatus 1, which will be described in detail with reference to FIG. 6.

The guide flow path 130 of the various embodiments may include a soundproof module 520 (refer to FIG. 1) disposed inside the groove 135. The soundproof module 520 may be implemented as a soundproof pad or a soundproof device, and may absorb or remove a rear sound such that the rear sound transmitted to the groove 135 is not reflected in the direction of the outer hole 131.

The soundproof module 520 of various embodiments may be implemented as a dual wall structure for blocking reflection of a rear sound, or a soundproof pad or a soundproof member made of a material having high sound absorption and sound insulation, or the soundproof module 520 may be implemented as a noise cancellation device for offsetting transmitted rear sound by generating a wave of anti-phase.

FIGS. 3B and 3C are cross-sectional views of a portion of a sound outputting apparatus 1 according to an embodiment of the disclosure.

Referring to FIGS. 3B and 3C, the guide flow path 130 according to an embodiment of the disclosure may extend from an inner side of the base 105 to an outer side of the base 105 and the cross-sectional area of the base 105 may increase.

As shown in FIG. 3B, the guide flow path 130 of the various embodiments may have a horn shape, due to the cross-sectional area increasing at an increasing rate in a direction from the inner side of the base 105 toward the outer side of the base 105. In detail, the height of the guide flow path 130 may increase at an increasing rate in a direction from the groove 235 toward the outer hole 231. Therefore, the gradient of the upper surface of the guide flow path 130 adjacent to the groove 235 may be smaller than the gradient of the upper surface of the guide flow path 130 adjacent to the guide portion 233. The height of the guide flow path 130 may be maintained constant at a position adjacent to the outer hole 231.

As shown in FIG. 3C, the guide flow path 130 of the various embodiments may have an inverse-horn shape, due to the cross-sectional area increasing at a decreasing rate in the direction from the inner side of the base 105 toward the outer side of the base 105. Specifically, the height of the guide flow path 130 may increase at a decreasing rate from the groove 335 toward the direction of the external hole 331. Therefore, the gradient of the upper surface of the guide flow path 130 adjacent to the guide portion 333 may be smaller than the gradient of the guide flow path 130 adjacent to the groove 335. The height of the guide flow path 130 may be maintained constant at a position adjacent to the external hole 331. A technical effect of the guide flow path 130 of FIGS. 3A to 3C will be described in detail with reference to the graph 510 of FIG. 4.

The guide flow path 130 of various embodiments may have a structure in which the cross-sectional area thereof becomes narrower toward the outside, and may have a stair structure in which the cross-sectional area increases or decreases in a stepwise manner.

The height of the guide flow path 130 of various embodiments may be varied. For example, the guide flow path 130 may have a height of between 1 mm and 4 mm.

Figure 4:
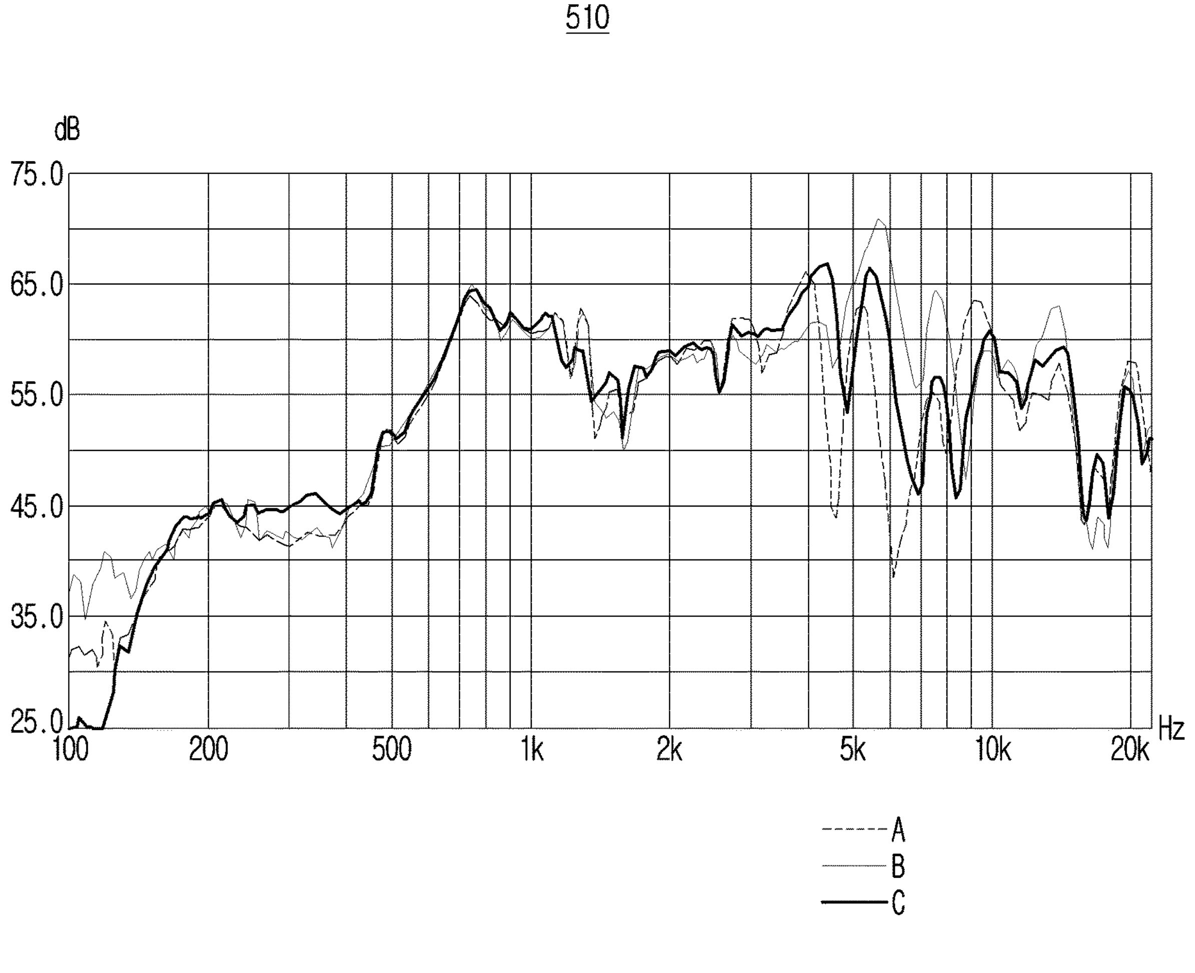
FIG. 4 is a graph illustrating a sound intensity with respect to a frequency of a sound outputting apparatus according to an embodiment of the disclosure.

FIG. 4 is a graph 510 illustrating a sound intensity with respect to a frequency of a sound outputting apparatus 1 according to embodiments of the disclosure.

Referring to FIG. 4, the x-axis is the frequency of the sound output by the sound outputting apparatus 1, and the y-axis represents the intensity of the sound output by the sound outputting apparatus 1. As shown in FIG. 3A, the line A is a result of the guide flow path 130 having a structure of which an upper surface has a flat structure, and the line B is a result of the guide flow path 130 having the horn structure as shown in FIG. 3B, and the line C is a result of the guide flow path 130 having the reverse-horn structure as shown in FIG. 3C.

Referring to the results of FIG. 4, it may be seen that the line B and the line C output a planar sound intensity over the line A in a high frequency region of 3 kHz to 4 kHz or higher.

More specifically, in the intensity of sound according to a sound frequency, a dip having a low sound intensity than adjacent sound frequency and peak having a higher sound intensity than the adjacent sound frequency may occur. In this case, it is possible to determine that the sound flatness is high if the number of dip and peak occurrences is small, sound intensity difference with the adjacent frequency in the dip and the peak is small, or the sound intensity difference between dip and peak is small.

Compared to line A, the line B and line C have small sound intensity difference in dip or peak in the high-frequency domain, and the difference of sound intensity between dip and peak is small, so it may be identified that sound flatness is improved.

Referring to the experimental results of FIG. 4, as the shape of the guide flow path 130 varies, sound flatness becomes different and sound quality may be improved. When the guide flow path 130 is deployed in the outer side of the base 105 from the inner side of the base 105 and the cross-sectional area increases, the sound flatness may be improved.

Figure 5A:
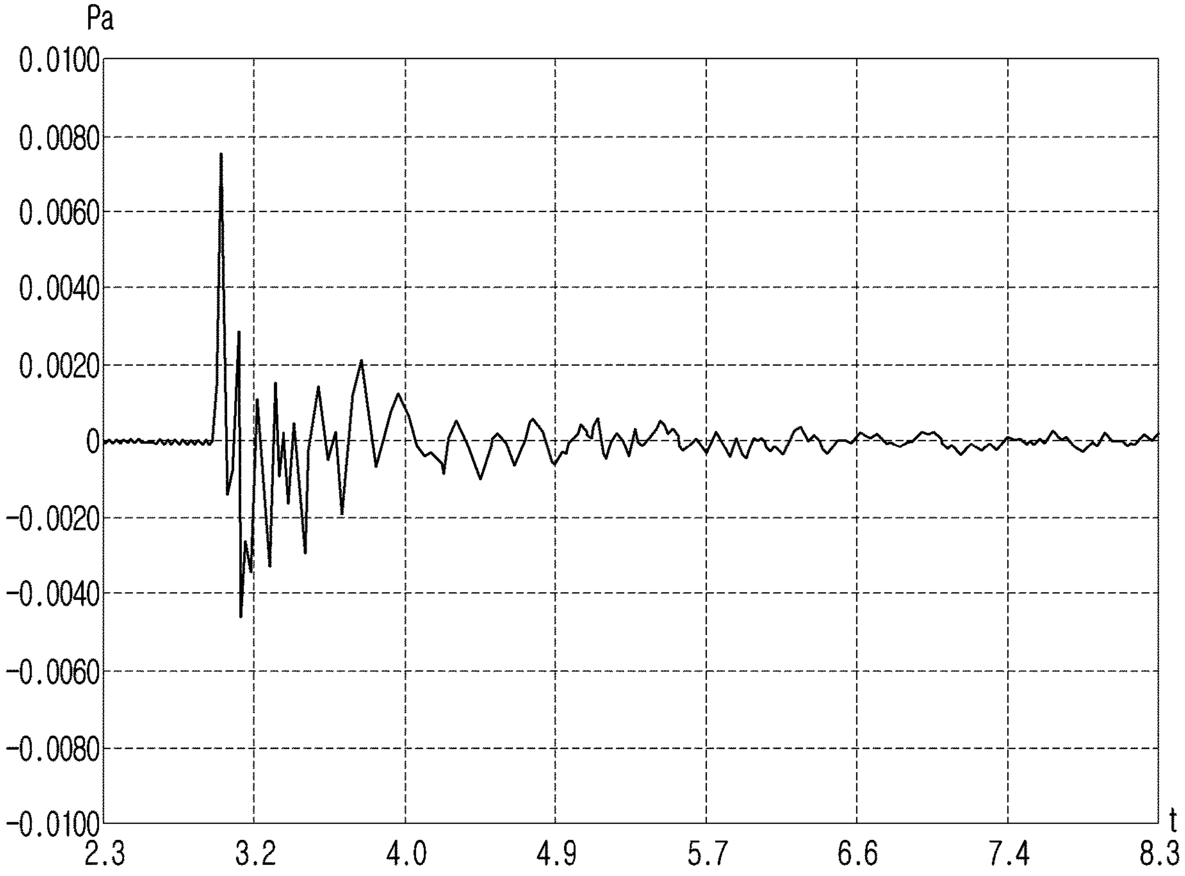
FIG. 5A is a graph illustrating sound characteristics of a sound outputting apparatus according to an embodiment of the disclosure.
Figure 5B:
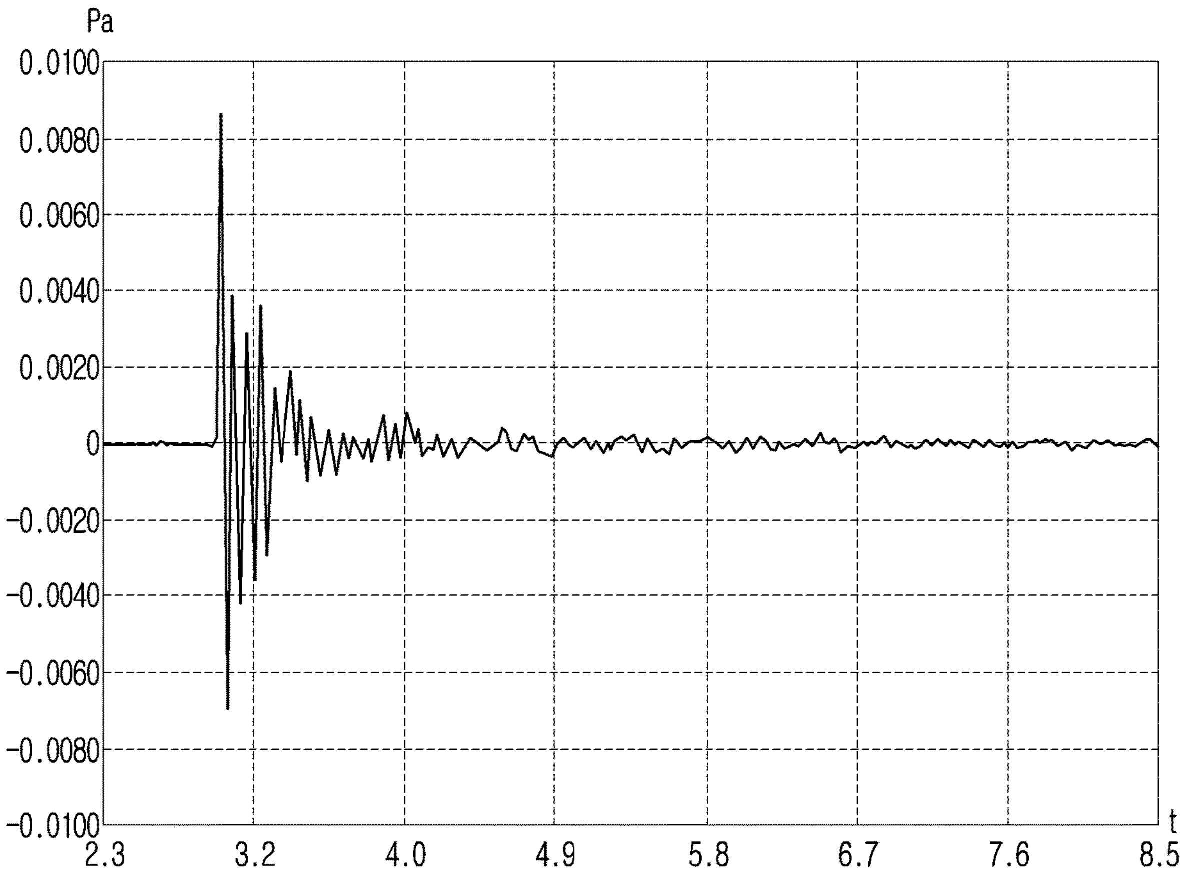
FIG. 5B is a graph illustrating sound characteristics for a time of a sound outputting apparatus according to an embodiment of the disclosure.

FIGS. 5A and 5B are graphs 512 and 514 illustrating sound characteristics of a sound outputting apparatus 1 according to an embodiment of the disclosure.

In FIGS. 5A to 5B, the X-axis represents time, and the Y-axis represents a sound pressure by sound outputted by the sound outputting apparatus 1. FIG. 5A is a result of the guide flow path 130 of which the upper surface has a flat plate structure as shown in FIG. 3A, and FIG. 5B is a result of the guide flow path 130 having the horn structure as shown in FIG. 3B.

Referring to the results of FIGS. 5A and 5B, the guide flow path 130 having the horn structure may have amplitude converged rapidly relative to the guide flow path 130 having a flat plate structure.

In detail, when the sound outputting apparatus 1 starts outputting sound, the sound is copied and spread to the air which is a medium, and the sound pressure around the sound outputting apparatus 1 may be changed. This may cause the speaker unit 110 to generate sound distortion or noise immediately after the sound outputting apparatus 1 is driven, and when the sound pressure change amount is small or sound pressure is rapidly stabilized, it may be determined that the sound characteristics are stable.

Referring to FIG. 5B, the guide flow path 130 having the horn structure, in comparison to the flat plate structure, has sound pressure which is stabilized relatively fast, and the sound pressure change is little during the driving of the operation of the sound outputting apparatus 1 so that it is identified that the sound feature is stable.

Referring to the experimental results of FIGS. 5A and 5B, the sound characteristics of the sound outputting apparatus 1 vary as the shape of the guide flow path 130 varies, and the sound characteristics may be improved when the guide flow path 130 extends from the inner side of the base 105 toward the outer side of the base 105 and the cross-sectional area increases.

Figure 6:
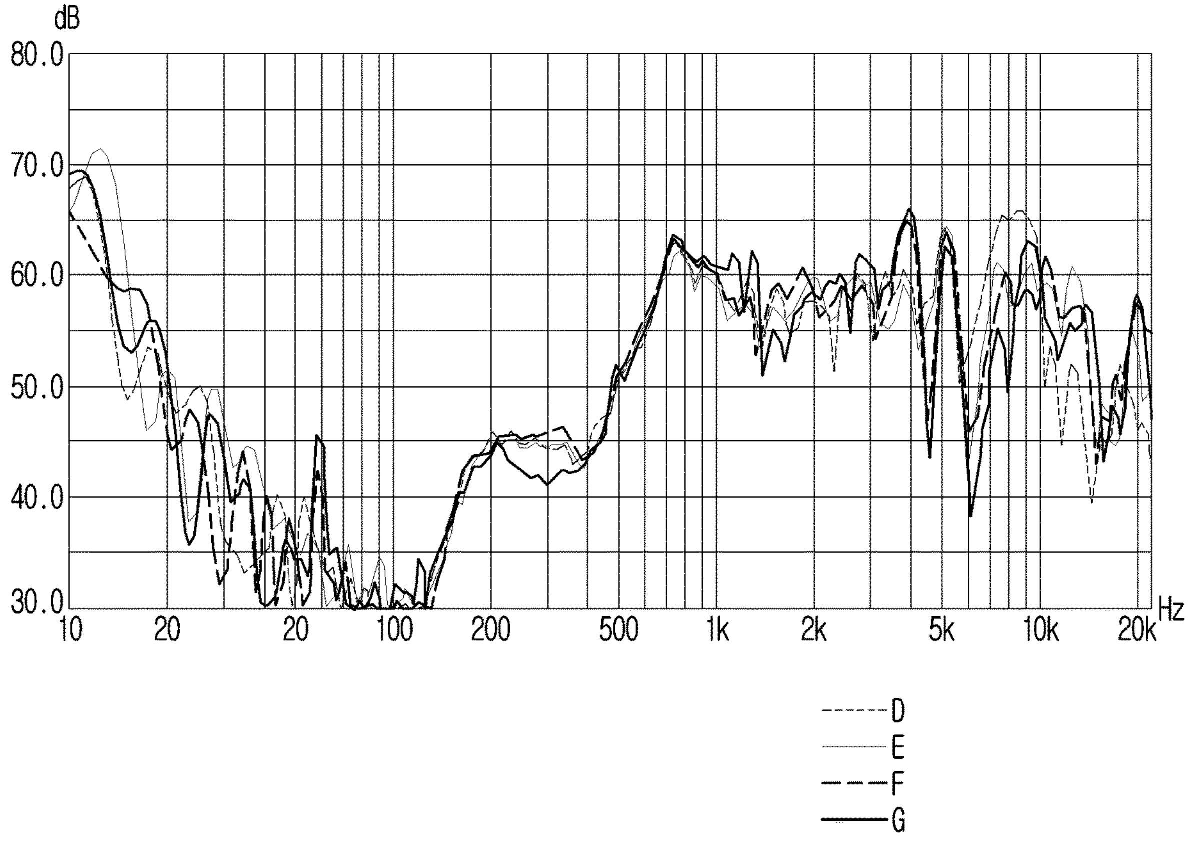
FIG. 6 is a graph illustrating a sound intensity with respect to a frequency of a sound outputting apparatus according to various embodiments of the disclosure.

FIG. 6 is a graph 516 illustrating a sound intensity with respect to a frequency of a sound outputting apparatus 1 according to various embodiments of the disclosure.

In FIG. 6, the x-axis is the frequency of the sound output by the sound outputting apparatus 1, and the y-axis represents the intensity of the sound output by the sound outputting apparatus 1. The line D to line G show experimental results according to the height h of the guide flow path 130.

Specifically, as shown in FIG. 3A, the line D shows a result in an example where, in the guide flow path 130 of which an upper surface has a flat structure as illustrated in FIG. 3A, the height h of the guide flow path 130 is set to 1 mm, the line E is the result of a case where the height h of the guide flow path 130 is set to 2 mm, the line F is the result of a case where the height h of the guide flow path 130 is set to 3 mm, and the line G is a result where the height h of the guide flow path 130 is set to 4 mm.

Referring to the results of FIG. 6, in the overall frequency domain, the line D, the line E, and the line F output a planar sound intensity, as compared to line G.

As previously described, the sound flatness may be confirmed by dip and peak in the intensity of sound according to the sound frequency. Referring to FIG. 6, the intensity difference of the sound at the dip and peak in the frequency domain is small for line D, line E, and line F as compared to line G, and in particular, the intensity difference of the sound at the dip and peak is small in the high frequency domain for line E and line F, and thus, it may be identified that sound flatness is improved.

Referring to the experimental results of FIG. 6, when the height h of the guide flow path 130, which is a height from the base 105 or the speaker unit 110 to the lower surface of the cover 120, varies, sound flatness of the sound outputting apparatus 1 may vary, causing improvement of sound quality, and sound flatness may be improved when the height h of the guide flow path 130 has a height of 1 mm to 3 mm, preferably 2 mm to 3 mm.

FIGS. 7A to 7D are cross-sectional views illustrating a portion of a sound outputting apparatus 1 according to embodiments of the disclosure.

More specifically, FIGS. 7A to 7D are diagrams illustrating a part of an area of a cross-sectional view which cuts the sound outputting apparatus 1 of various embodiments in a direction of A-A' of FIG. 2.

Referring to FIGS. 7A to 7D, the groove 135 of the guide flow path 130 according to embodiments of the disclosure may include inner holes having various structures.

The inner holes may be formed in the groove 135, and may be an opening that is opened to transmit the output sound guided to the groove 135, among the output sound of the speaker unit 110, that is, the rear sound to the outside of the guide flow path 130.

According to embodiments, the inner holes may include first to third inner holes 136, 137, and 138 according to the connection with a configuration different from the opened direction, and one guide flow path 130 may include at least one of the first to third inner holes 136, 137, and 138.

The plurality of the guide flow path 130 may have the same structure as shown in the drawings, but are not limited thereto, and for example, at least some of the plurality of the guide flow path 130 may have a flat plate structure, and others of the plurality of the guide flow path 130 may have a structure of a reverse-horn structure. Alternatively, all of the plurality of the guide flow path 130 may have a horn structure or an inverse-horn structure. Hereinafter, referring to FIGS. 7A to 7D, the structure of the sound outputting apparatus 1 is described with reference to the cross section of the plurality of the guide flow path 130 having the same flat plate structure, and the embodiment is not limited thereto in actual implementation.

Figure 7A:
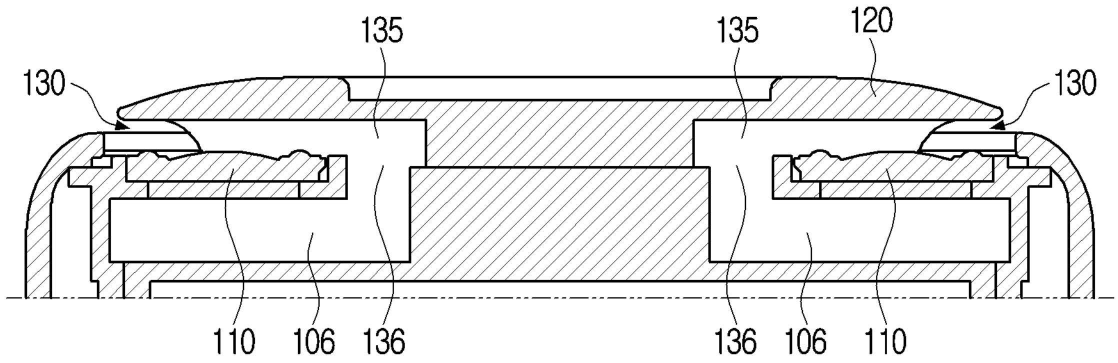
FIG. 7A is a cross-sectional view illustrating a portion of a sound outputting apparatus according to an embodiment of the disclosure.

Referring to FIG. 7A, the first inner hole 136 may be opened downward to guide a rear sound, which is an output sound guided toward the center of the base 105, in a direction toward the base 105. In this case, an internal space 106 for receiving a rear sound may be provided inside the base 105.

A soundproof module 520 (refer to FIG. 1) for absorbing or removing the received rear sound may be provided in the internal space 106 of the base 105. The soundproof module 520 may be implemented as a soundproof pad or a soundproof device, and may absorb or remove a rear sound transmitted to the base 105 through the first inner hole 136.

Although not shown in the drawings, the internal space 106 of the base 105 of one embodiment may be provided in plural to respectively correspond to the plurality of the guide flow path 130, and at least some of the plurality of the internal space 106 may be interconnected.

According to an embodiment, the plurality of the internal space 106 connected to each other may include a phase conversion module 510 (refer to FIG. 1) to offset a plurality of rear sounds received from the plurality of the first inner hole 136 of each of the plurality of the guide flow path 130. The phase conversion module 510 may be a device that converts the received rear sound into a reverse phase or a different phase so that the received rear sound is offset from the other rear sound. Alternatively, the processor 20 of one embodiment may control the phase of the output sound of some of the plurality of the speaker unit 110 to offset the plurality of rear sounds within the internal space 106.

The sound outputting apparatus 1 according to various embodiments may improve sound flatness of the sound outputting apparatus 1 and improve sound quality by processing the rear sound transmitted to the internal space 106 through the above structure of the sound outputting apparatus 1 or a variety of ways which are not limited thereto.

Figure 7B:
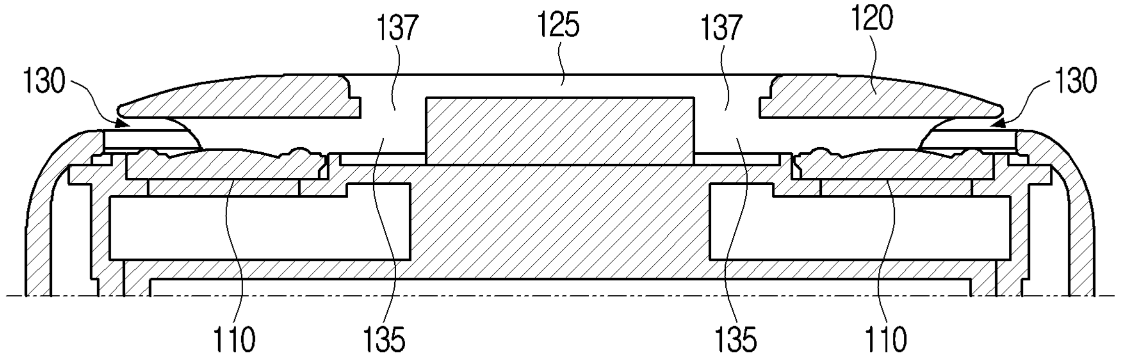
FIG. 7B is a cross-sectional view illustrating a portion of a sound outputting apparatus according to an embodiment of the disclosure.

Referring to FIG. 7B, the second internal hole 137 may be opened upward to guide a rear sound, which is an output sound guided toward a center of the base 105, to an upper portion of the cover 120. In this case, the cover 120 may include an upper space 125 to receive a rear sound.

The upper space 125 may have a structure in which the upper surface is opened, so that the received rear sound may be guided to the outside of the sound outputting apparatus 1. In this example, the rear sound may be transmitted to the outside of the sound outputting apparatus 1 through the upper space 125, and the sound outputting apparatus 1 may output the front and rear sounds to different positions. The processor 20 or the audio module 70 may control the plurality of the speaker unit 110 in consideration of the output position and frequency characteristics of the front and rear sound, thereby generating an interference phenomenon, and may induce sound quality improvement in consideration of the position and driving environment of the user.

The structure of the upper space 125 is not limited to the open structure, and the upper space 125 may have a closed structure without opening the upper surface of the upper space 125, and the rear sound may be absorbed or removed in the upper space 125. In FIG. 7B, it is described that the plurality of the guide flow path 130 are connected through the upper space 125, but the embodiment is not limited thereto, and the upper space 125 may be divided to correspond to the plurality of the guide flow path 130.

The soundproof module 520 for absorbing or removing the received rear sound may be provided in the upper space 125. The soundproof module 520 may be implemented as a soundproof pad or a soundproof device, and may absorb or remove a rear sound transmitted to the cover 120 through the second internal hole 137. Alternatively, the phase conversion module 510 may be provided in the upper space 125 to offset the plurality of rear sounds received from the plurality of the second internal hole 137 of each of the plurality of the guide flow path 130.

The sound outputting apparatus 1 according to various embodiments may improve sound flatness of the sound outputting apparatus 1 and improve sound quality by processing the rear sound transmitted to the upper space 125 through the above structure or in a variety of ways, which are not limited thereto.

Figure 7C:
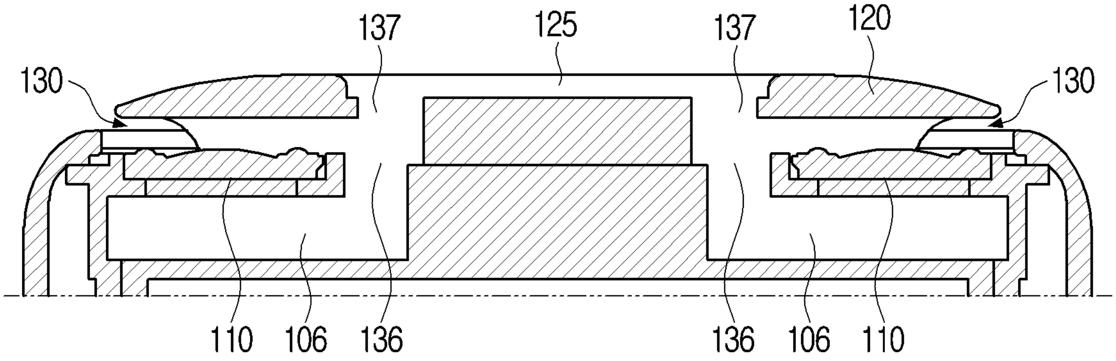
FIG. 7C is a cross-sectional view of a portion of a sound outputting apparatus according to an embodiment of the disclosure.

Referring to FIG. 7C, the groove 135 may have a plurality of the first to third inner holes 136, 137, and 138. For example, one groove 135 may include both the first internal hole 136 and the second internal hole 137.

In this case, some of the rear sounds may be guided into the internal space 106 of the base 105, another portion may be guided into the upper space 125 of the cover 120, and the rear sound may be processed as in the method described with respect to FIGS. 7A-7B.

The first to third inner holes 136, 137, and 138 of one embodiment may have a diameter of between 3 mm and 7 mm, or although not shown in the drawings, one of the first to third inner holes 136, 137, 138 may have a part of an area opened and a part of an area blocked to be implemented as a plurality of sub holes.

Figure 7D:
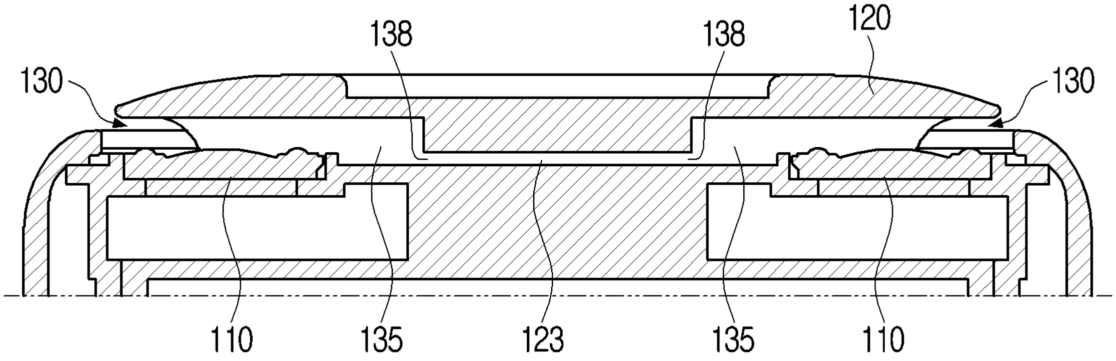
FIG. 7D is a cross-sectional view illustrating a portion of a sound outputting apparatus according to an embodiment of the disclosure.

Referring to FIG. 7D, the third inner hole 138 may be opened to guide a rear sound, which is an output sound guided toward the center of the base 105, to the groove 135 of another one of the guide flow path 130. In this case, the groove 135 of one of the plurality of the guide flow path 130 and the groove 135 of the other one of the guide flow path 130 may be connected to each other to form the internal flow path 123.

The two of the guide flow path 130, which communicate with each other, and in which the internal flow path 123 is formed, may be symmetrical with respect to the center of the base 105. Therefore, in an embodiment including an even number of the speaker unit 110 and the guide flow path 130, the internal flow path 123 may be formed between two of the guide flow path 130 that are symmetrical.

The internal flow path 123 may include a soundproof module 520 for absorbing or removing the received rear sound. The soundproof module 520 may be implemented as a soundproof pad or a soundproof device, and may absorb or remove a rear sound transmitted to the internal flow path 123 through the third internal hole 138.

A phase conversion module 510, which converts an output sound guided toward the center of the base 105 to a reverse phase, may be provided between the plurality of the guide flow path 130 communicating with each other among that is, in the internal flow path 123. The phase conversion module 510 may offset the plurality of rear sounds received from the third internal hole 138. Alternatively, the processor 20 may control the phase of the output sound of some of the plurality of the speaker unit 110 to output an output sound having a reverse phase with the other one of the speaker unit 110, thereby offsetting the plurality of rear sounds in the internal flow path 123.

The sound outputting apparatus 1 according to various embodiments may improve the sound flatness of the sound outputting apparatus 1 and improve sound quality by processing the rear sound transmitted to the internal flow path 123 through the above structure or various methods, which are not limited thereto.

Figure 8A:
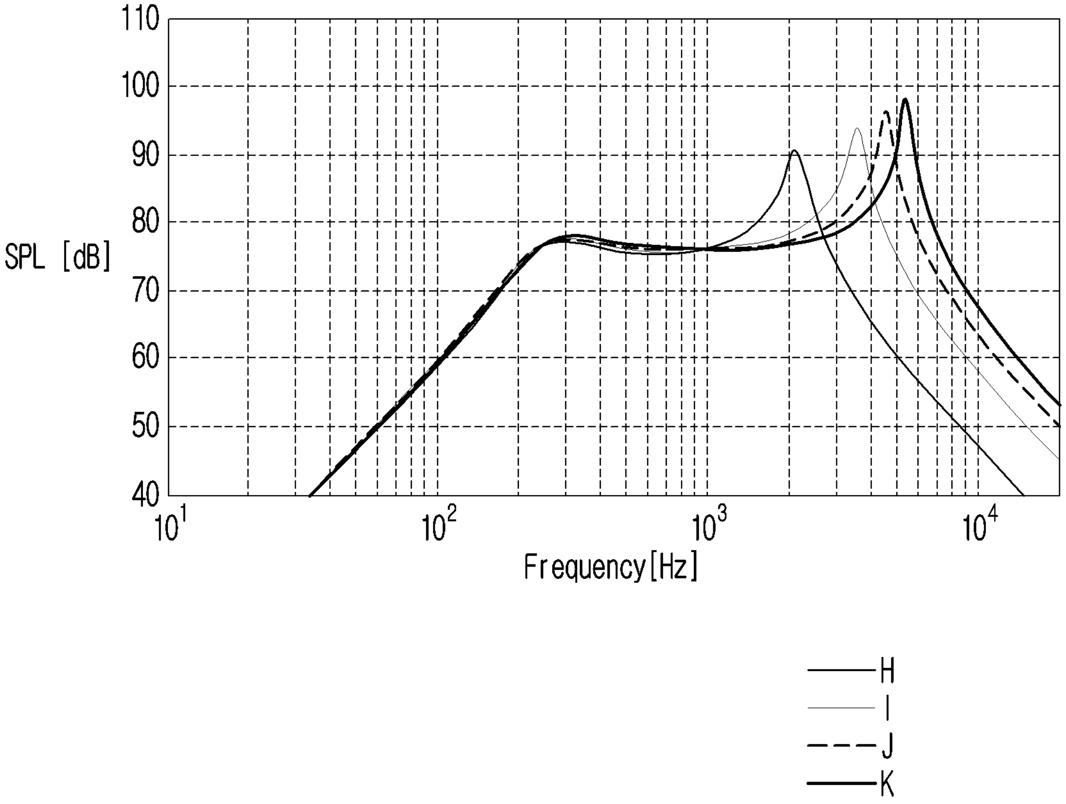
FIG. 8A is a graph illustrating a sound intensity for a frequency of a sound outputting apparatus according to an embodiment of the disclosure.

FIG. 8A is a graph 518 illustrating a sound intensity for a frequency of a sound outputting apparatus 1 according to an embodiment of the disclosure.

Referring to FIG. 8A, the X-axis represents the frequency of the sound output by the sound outputting apparatus 1, and the Y-axis represents the intensity of the sound output by the sound outputting apparatus 1. The line H refers to a result of the sound outputting apparatus 1 not including any of the first to third inner holes 136, 137, and 138, the line I refers to the result of the sound outputting apparatus 1 including five from among the first to third inner holes 136, 137, 138 having a diameter of 5 mm, the line J refers to a result of the sound outputting apparatus 1 including 10 from among the first to third inner holes 136, 137, 138 having a diameter of 5 mm, and the line K is a result of the sound outputting apparatus 1 including 15 from among the first to third inner holes 136, 137, 138 having a diameter of 5 mm.

Referring to the result of FIG. 8A, it is possible to identify that the sound of the sound outputting apparatus 1 is gradually expanded to a high frequency from the line H, that refers to an embodiment that does not include any of the first to third inner holes 136, 137, and 138, toward the line K that refers to an embodiment having many of the first to third inner holes 136, 137, and 138.

In detail, in the high-frequency domain of 3 kHz or higher, the sound intensity of the sound outputting apparatus 1 of the slim design or hidden design may be reduced when the high-frequency sound is outputted by the waveguide structure having the function of the low-pass filter. For example, it may be identified that the embodiment represented by the line H that does not include any of the inner holes 136, 137, and 138 has drastically reduced sound intensity at 2 kHz or above.

In the line I, the line J, and the line K, the sound intensity has a relatively high value in the high frequency domain of 3 kHz or higher, so that it may be identified that the intensity of the sound is improved in the high frequency domain.

Referring to the experimental results of FIG. 8A, when the plurality of the guide flow path 130 include a plurality of one or more of the first to third inner holes 136, 137, and 138, it is possible to solve the problem of deterioration in sound quality in a high frequency region which may occur due to a slim design or a hidden design, and the plurality of the guide flow path 130 may include 5 to 15 of the first to third inner holes 136, 137, and 138.

Figure 8B:
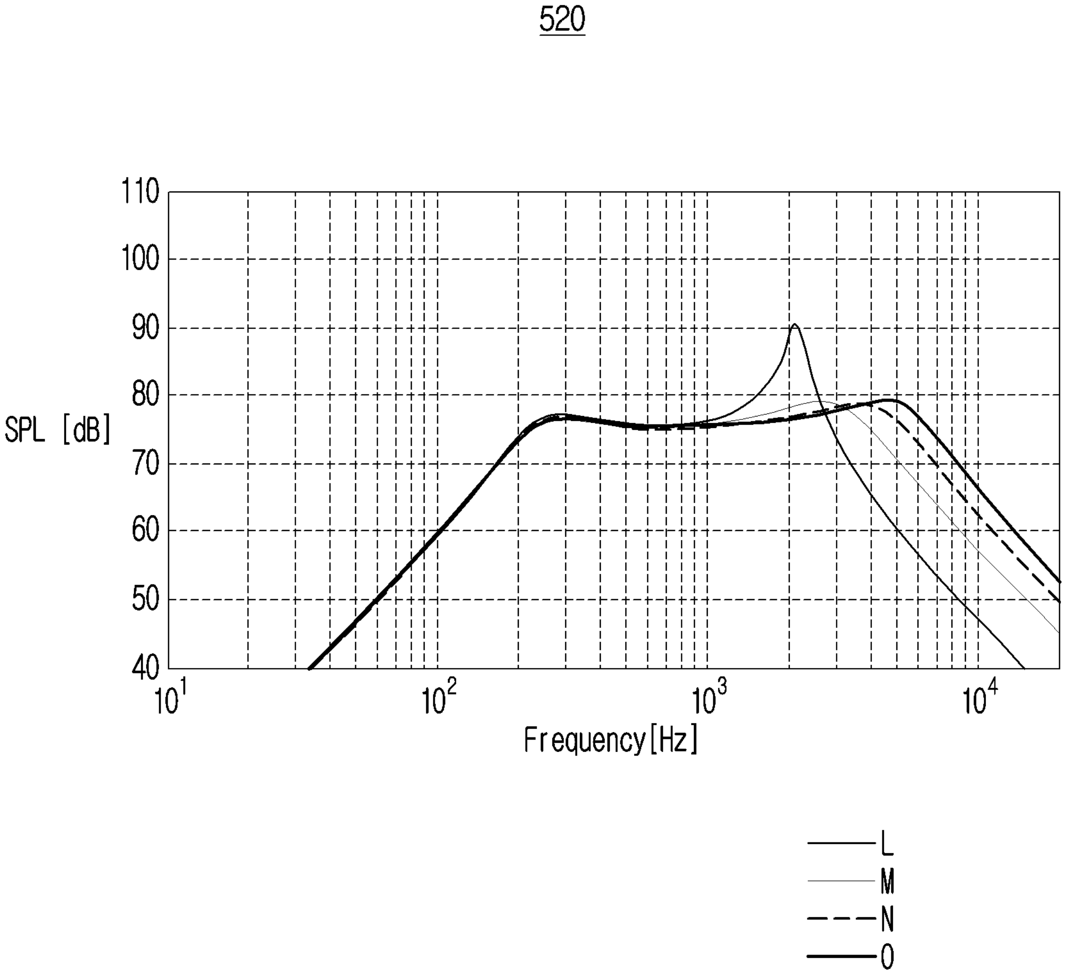
FIG. 8B is a graph illustrating the sound intensity for the frequency of the sound outputting apparatus of an embodiment of the disclosure.

FIG. 8B is a graph 520 illustrating the sound intensity for the frequency of the sound outputting apparatus 1 of an embodiment of the disclosure.

Referring to FIG. 8B, the X-axis refers to the frequency of the sound output by the sound outputting apparatus 1, the Y-axis represents the intensity of the sound output by the sound outputting apparatus 1, and the sound outputting module 10 of the line L to the line O includes at least one soundproof module 520 formed in the groove. The soundproof module 520 may be implemented as a soundproof pad or a soundproof device, and may absorb or remove the rear sound.

The line L refers to a result of the sound outputting apparatus 1 not including any of the first to third inner holes 136, 137, and 138, the line M refers to the result of the sound outputting apparatus 1 including five from among the first to third inner holes 136, 137, 138 having a diameter of 5 mm, the line N refers to a result of the sound outputting apparatus 1 including 10 from among the first to third inner holes 136, 137, 138 having a diameter of 5 mm, and the line O is a result of the sound outputting apparatus 1 including 15 from among the first to third inner holes 136, 137, 138 having a diameter of 5 mm.

Referring to the result of FIG. 8B, in the embodiment including the soundproof module 520 in the groove 135, the sound of the sound outputting apparatus 1 is gradually expanded to a high frequency from the line L, that represents the embodiment that does include any of the first to third inner holes 136, 137, and 138, toward the line O that represents the embodiment having many from among the first to third inner holes 136, 137, and 138, and as the peak intensity occurring in the high frequency is lowered in line M, line N, and line O including a plurality from among the first to third inner holes 136, 137, 138, and sound flatness may be improved.

In detail, in the line L not including any of the first to third the inner holes 136, 137, 138, and including the soundproof module 520, a peak is formed similar to FIG. 8A, but in the line M, line N, and line O including a plurality from among the first to third inner holes 136, 137, 138, and including the soundproof module 520, the frequency intensity may be improved, and the intensity difference is relatively smaller compared to the area where peak is adjacent.

Referring to the experimental results of FIG. 8B, when the plurality of the guide flow path 130 include a plurality from among the first to third inner holes 136, 137, 138, and the soundproof module 520, it is possible to solve the problem of deterioration in sound quality in a high frequency region which may occur due to a slim design or a hidden design, and sound flatness in a high frequency region may be improved.

Figure 9:
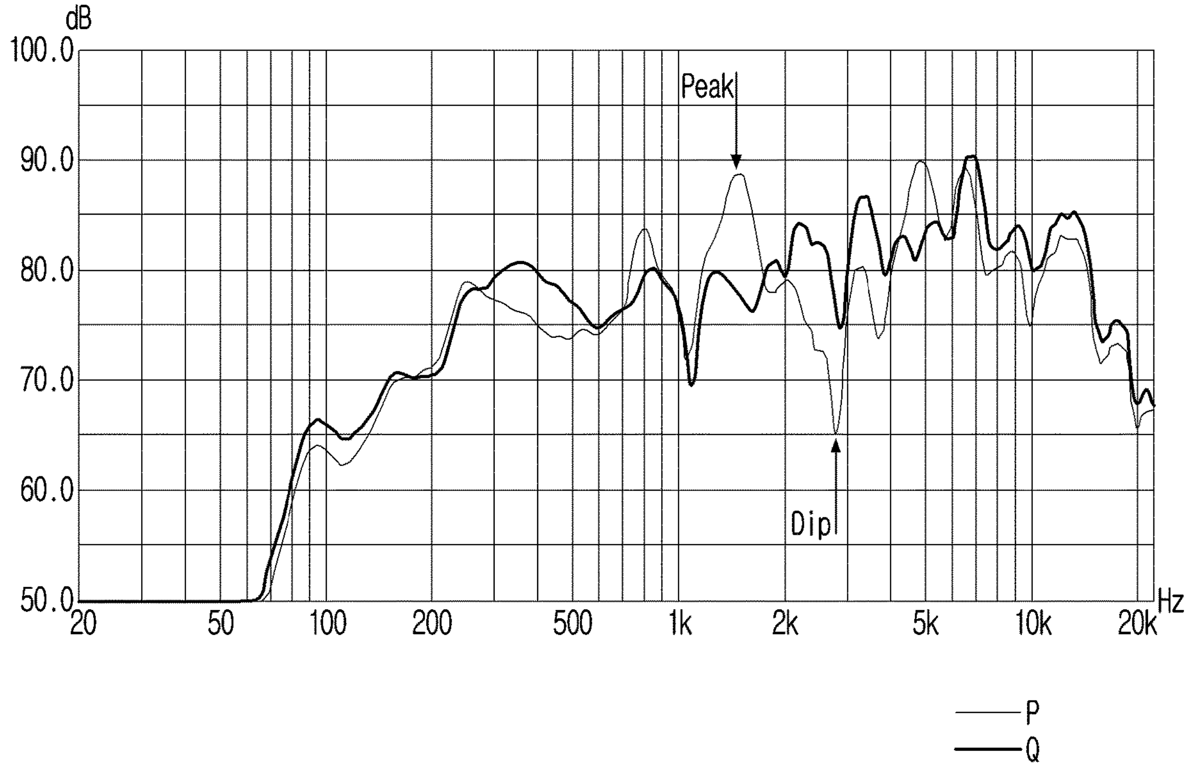
FIG. 9 is a graph illustrating a sound intensity for a frequency of a sound outputting apparatus according to various embodiments of the disclosure.

FIG. 9 is a graph 522 illustrating a sound intensity for a frequency of a sound outputting apparatus 1 according to various embodiments of the disclosure.

In FIG. 9, the X-axis is the frequency of the sound output by the sound outputting apparatus 1, and the Y-axis represents the intensity of the sound output by the sound outputting apparatus 1. The line P is a result of a plurality of the guide flow path 130 which do not include any of the first to third inner holes 136, 137, and 138, and the line Q is a result of the plurality of the guide flow path 130 including one or more among the first to third inner holes 136, 137, and 138.

Referring to the result of FIG. 9, in the high frequency domain of 1 kHz or higher, it may be identified that the line Q outputs flat sound intensity compared to the line P.

In detail, the line Q has smaller sound intensity difference than the adjacent area in dip or peak in the high-frequency region, and the difference in the sound intensity between the dip and peak is small, and it may be identified that the sound flatness is improved.

Referring to the experimental results of FIG. 9, the sound outputting apparatus 1 having the guide flow path 130 including one or more among the first to third inner holes 136, 137, and 138 may have improved sound flatness and improved sound quality.

Figure 10:
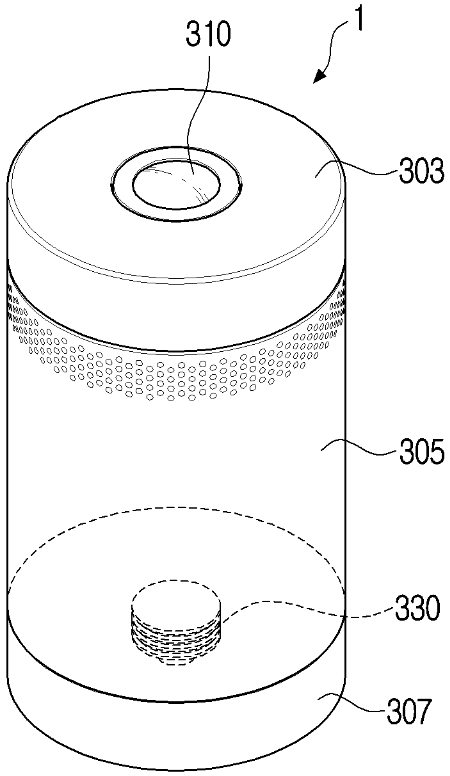
FIG. 10 is a perspective view illustrating the exterior of a sound outputting apparatus according to an embodiment of the disclosure.

FIG. 10 is a perspective view illustrating the exterior of a sound outputting apparatus 1, according to one embodiment of the disclosure. Referring to FIG. 10, the sound outputting apparatus 1 according to another embodiment of the disclosure may have a display function or an optical output function, and may include a head 303, a main body 305, a projection lens 310, a connector 330, and/or a cover 307.

The sound outputting apparatus 1 having an optical output function may be implemented in various types of devices. In particular, the sound outputting apparatus 1 may be a projector device that magnifies and projects an image into a wall or screen, and the projector device may be a digital light processing (DLP) type projector that uses a liquid crystal display (LCD) projector or a digital micromirror device (DMD).

The sound outputting apparatus 1 may be a home or industrial display device, or may be a lighting device used in daily life, and may be implemented as a portable communication device (e.g., a smartphone), a computer device, a portable multimedia device, a wearable device, or a home appliance. The sound outputting apparatus 1 according to an embodiment of the disclosure is not limited to the above-described apparatus, and the sound outputting apparatus 1 may be implemented as the sound outputting apparatus 1 having two or more functions of the above-described devices. For example, the sound outputting apparatus 1 may be utilized as a display device, a lighting device, or an audio device by turning off the projector function according to the operation of the processor and turning on the lighting function or the speaker function, and may be used as an artificial intelligence (AI) speaker including a microphone or a communication device.

The main body 305 is a housing forming an outer exterior and may support or protect one or more components (e.g., the configuration shown in FIG. 12) of the sound outputting apparatus 1 disposed within the main body 305. The shape of the main body 305 may have a structure close to a cylindrical shape as shown in FIG. 10. However, the shape of the main body 305 is not limited thereto, and according to various embodiments of the disclosure, the main body 305 may be implemented in a variety of geometric shapes, such as columns, cones, and spheres having a polygonal cross-section.

The size of the main body 305 may be a size that the user may grip or move with one hand, and may be implemented in a very small size to be easily carried, or may be implemented in a size that may be mounted on a table or coupled to a lighting device.

The material of the main body 305 may be formed of a matte metal or a mixing resin so as to prevent the user's fingerprint or dust from being attached, or the exterior of the main body 305 may be made of smooth gloss.

A friction region may be formed in a portion of the exterior of the main body 305 so that the user may grip and move the main body 305. Alternatively, the main body 305 may be provided with a bent grip portion or support (see FIGS. 13 and 14), which may be gripped by a user in at least some areas.

The projection lens 310 is formed on one surface of the main body 305 to project the light passing through the lens array to the outside of the main body 305. The projection lens 310 of various embodiments may be a low dispersion-coated optical lens to reduce chromatic aberration. The projection lens 310 may be a convex lens or a condensing lens, and the projection lens 310 of one embodiment may adjust the position of a plurality of sub-lenses to adjust the focus.

The head 303 may be coupled to one surface of the main body 305 to support and protect the projection lens 310. The head 303 may be coupled to the main body 305 so as to swivel within a predetermined angle range with respect to one surface of the main body 305.

The head 303 may automatically or manually swivel by a user or processor to freely adjust the projection angle of the projection lens 310. Alternatively, although not shown in the drawings, the head 303 may be coupled to the main body 305 and include a neck extending from the main body 305 so that the head 303 may be flipped or tilted and adjust the projection angle of the projection lens 310.

The sound outputting apparatus 1 may adjust the direction of the head 303 while the position and the angle of the main body 305 are fixed, and adjust the exit angle of the projection lens 310, thereby projecting light or images to a desired position. The head 303 may also include a handle that may be held after the user rotates the handle in a desired direction.

A plurality of openings may be formed on the outer circumferential surface of the main body 305. The speaker unit 110 may be provided inside the plurality of openings, and the audio of the speaker unit 110 may be output to the outside of the main body 305 of the sound outputting apparatus 1. According to an embodiment of the disclosure, a heat dissipation fan (not shown) may be provided in the main body 305, and when the heat dissipation fan (not shown) is driven, air or heat inside the main body 305 may be discharged through the plurality of openings. The sound outputting apparatus 1 may discharge heat generated by the operation of the sound outputting apparatus 1 to the outside and prevent the sound outputting apparatus 1 from being overheated.

The connector 330 may connect the sound outputting apparatus 1 with an external device to transmit/receive electrical signals or receive power from the outside. According to an embodiment of the disclosure, the connector 330 may be physically connected to an external device. The connector 330 may include an input/output interface, and may be wired or wirelessly connected to an external device or may be supplied with power. For example, the connector 330 may include a high definition multimedia interface (HDMI) connection terminal, a universal serial bus (USB) connection terminal, a secure digital (SD) card receiving groove, an audio connection terminal or a power outlet, or may include a Bluetooth, Wi-Fi, or wireless charging connection module wirelessly connected to an external device.

The connector 330 may have a socket structure connected to the external lighting device, and may be connected to the socket receiving groove of the external lighting device to receive power. The size and specification of the connector 330 of the socket structure may be variously implemented in consideration of the receiving structure of the external device capable of being combined. For example, according to the International Specification E26, diameter of a junction portion of the connector 330 may be implemented at 26 mm, in which case the sound outputting apparatus 1 may be coupled to an external lighting device, such as a stand, by replacing a bulb which is commonly used. When coupled with a socket located in the existing ceiling, the sound outputting apparatus 1 may be projected downward, and when the sound outputting apparatus 1 is not rotated by the socket combination, the screen is not rotatable either. Even if the socket is combined and power is supplied, in order for the sound outputting apparatus 1 to be rotatable, the sound outputting apparatus 1 may emit or rotate the screen to the desired position by adjusting the emission angle and so that the head 303 which is coupled to the stand of the ceiling in the socket-coupled state is swiveled on one surface of the main body 305.

The connector 330 may include a coupling sensor, and the coupling sensor may sense whether the connector 330 is coupled to the external device, the combined state or the combined object, and transmit the sensed result to the processor, and the processor may control the operation of the sound outputting apparatus 1 based on the received sensing value.

The cover 307 may be coupled to and separated from the main body 305, and may protect the connector 330 so that the connector 330 is not constantly exposed to the outside. The shape of the cover 307 may have a continuous shape with the main body 305 as shown in FIG. 10, or may be implemented to correspond to the shape of the connector 330. The cover 307 may support the sound outputting apparatus 1, and the sound outputting apparatus 1 may be coupled to the cover 307 to be coupled to or mounted on an outer holder.

The sound outputting apparatus 1 of various embodiments may be provided with a battery inside the cover 307. The battery may include, for example, a primary battery which is not rechargeable, a rechargeable secondary battery, or a fuel cell.

Although not shown in the drawings, the sound outputting apparatus 1 may include a camera module, and the camera module may capture a still image and a moving image. According to one embodiment, the camera module may include one or more lenses, an image sensor, an image signal processor, or a flash.

The sound outputting apparatus 1 may include a protective case (not shown) to protect and facilitate the transfer of the sound outputting apparatus 1, or may include a stand (not shown) for supporting or fixing the main body 305, or a bracket (not shown) connectable to the wall or a partition.

The sound outputting apparatus 1 may be connected to various external devices using a socket structure to provide various functions. In one embodiment, the sound outputting apparatus 1 may be connected to an external camera device using a socket structure. The sound outputting apparatus 1 may be provided an image stored in the connected camera device or an image that is currently being captured using a projection unit 410 (refer to FIG. 12). In another embodiment, the sound outputting apparatus 1 may be connected to a battery module using a socket structure to receive power. The sound outputting apparatus 1 may be connected to an external device by using a socket structure, but this is merely an embodiment, and may be connected to an external device using another interface (e.g., a USB, etc.).

Figure 11:
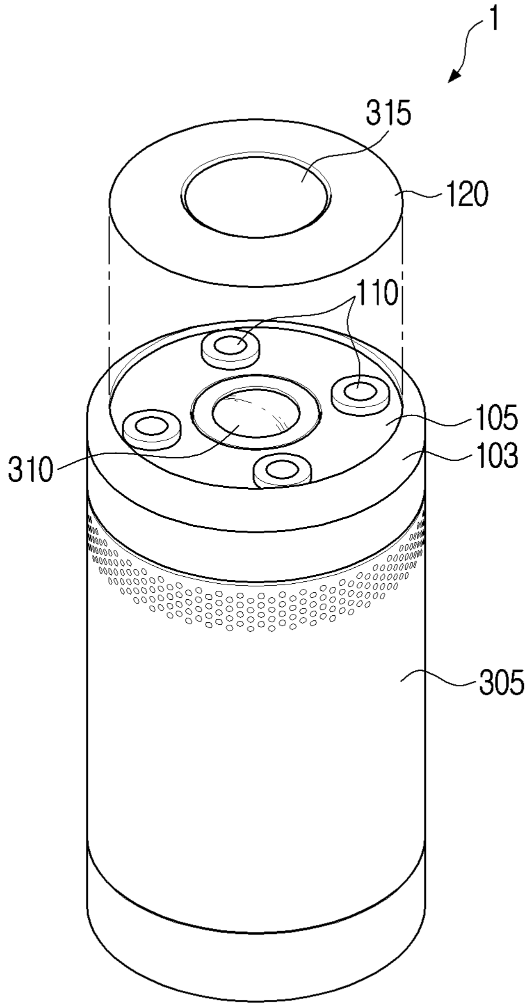
FIG. 11 is a perspective view illustrating the exterior of a sound outputting apparatus, according to an embodiment of the disclosure.

FIG. 11 is a perspective view illustrating the exterior of a sound outputting apparatus, according to an embodiment of the disclosure.

Referring to FIG. 11, the sound outputting apparatus 1 may include one or more of the speaker unit 110 disposed adjacently to the projection lens 310 and the cover 120.

The sound outputting apparatus 1 according to an embodiment of may include a base 105 coupled to one surface of the main body 305 and the case 103, and the speaker unit 110 may be disposed on an upper surface of the base 105. In this case, the projection lens 310 may be embedded in the base 105, and the light may be emitted in the upper direction of the base 105.

The cover 120 may be coupled on an upper surface of the base 105.

An opening 315 may be formed at the center of the cover 120, and when the cover 120 and the base 105 are coupled, the light emitted from the projection lens 310 may pass through the opening 315 and may be transmitted to the outside of the main body 305.

The cover 120 may include a plurality of the guide channel 130, and the outer hole 131, the guide portion 133, and the groove 135 formed by the structure of the base 105 and the cover 120 may be implemented in the same manner as described above in FIG. 3A, FIG. 3B, or FIG. 3C, for example.

Referring to FIG. 11, the sound outputting apparatus 1 may emit light from the opening 315 of the cover 120, and may have a structure in which the sound is radiated in 360 degrees of the outer surface of the cover 120. As a result, the sound outputting apparatus 1 may minimize sound distortion in image and sound transmission, and in particular, may provide uniform sound quality even in a high frequency domain.

Figure 12:
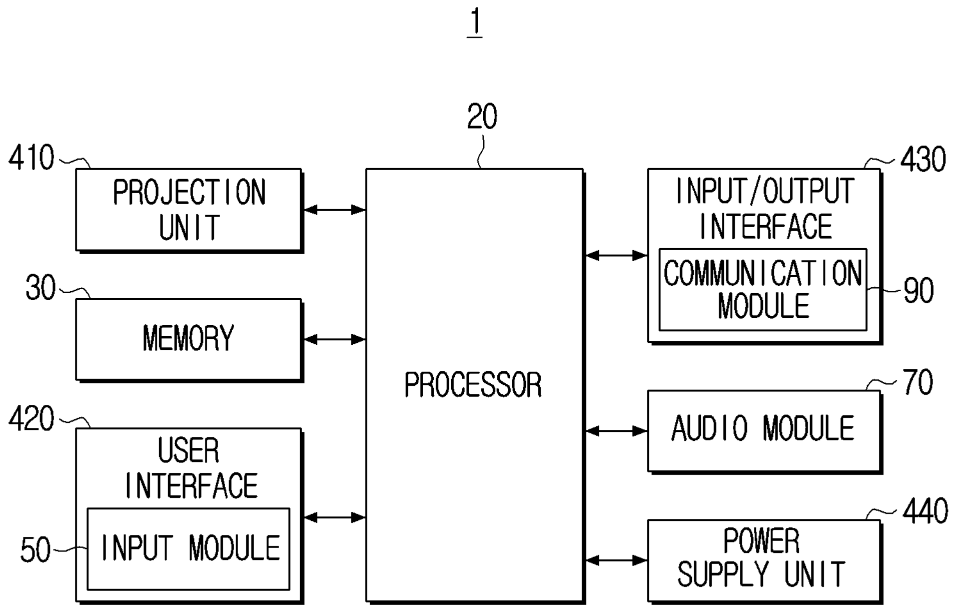
FIG. 12 is a block diagram of a sound outputting apparatus according to an embodiment of the disclosure.

FIG. 12 is a block diagram of a sound outputting apparatus according to an embodiment of the disclosure.

Referring to FIG. 12, the sound outputting apparatus 1 may include a projection unit 410, a memory 30, a user interface 420, an input/output interface (I/O interface) 430, an audio module 70, a power supply unit 440 (e.g. a power supply), and a processor 20.

The configuration shown in FIG. 12 is an example of the sound outputting apparatus 1 including a light output function, and some configurations may be omitted, and the configuration shown in FIG. 1 or a different configuration may be added.

The projection unit 410 is configured to project an image to the outside. According to an embodiment, the projection unit 410 may be implemented by a variety of projection methods (for example, a cathode-ray tube (CRT) method, a liquid crystal display (LCD) method, a digital light processing (DLP) method, a laser method, etc.). For example, the CRT display has basically the same principle as the CRT monitor. The CRT display displays an image on a screen by enlarging the image by the lens in front of the CRT. The number of braun tubes is divided into one tube type and a three tube type, and red, green, and blue braun tubes may be separately implemented for the three tube type.

In another example, an LCD display method displays an image by transmitting light from a light source to a liquid crystal. The LCD is divided into a single-plate type and a three-plate type, and in the case of the three-plate type, light emitted from the light source is divided into red, green, and blue in a dichroic mirror (a mirror reflecting light of a specific color and passing light of remaining colors), the light passes through the liquid crystal, and then the light may be collected to one place.

As another example, the DLP method is a method for displaying an image by using a digital micromirror device (DMD) chip. The DLP-based projection unit may include a light source, a color wheel, a DMD chip, a projection lens, and the like. The light output from the light source may be colored while passing through the rotating color wheel. The light passing through the color wheel is input to the DMD chip. The DMD chip includes a number of micro mirrors, and reflects the light input to the DMD chip. The projection lens may serve to enlarge the light reflected from the DMD chip to the size of the image.

As another example, the laser scheme includes a diode pumped solid state (DPSS) laser and a galvanometer. A laser for outputting various colors uses a laser overlapped with an optical axis by using a special mirror after three colors of the DPSS laser are installed for each RGB color. The galvanometer includes a mirror and a high output motor and moves the mirror at a fast rate. For example, the galvanometer may rotate the mirror at a maximum of 40 KHz/sec. The galvanometer is mounted according to the scan direction, and generally, the projector may be divided into x and y axes because of the plane scanning.

The projection unit 410 may include various types of light sources. For example, the projection unit 410 may include a light source of at least one of a lamp, LED, or laser.

The projection unit 410 may output an image with 4:3 screen ratio, 5:4 screen ratio, 16:9 wide screen ratio according to the usage of the sound outputting apparatus 1 or user setting, or the like, and may output image with various resolutions such as WVGA(854*480), SVGA(800*600), XGA(3024*768), WXGA(1280*720), WXGA(1280*800), SXGA(1280*1024), UXGA(1600*1200), Full HD(1920*1080) according to the screen ratio.

The projection unit 410 may perform various functions for adjusting the output image by the control of the processor 20. For example, the projection unit 410 may perform functions such as zoom, keystone, quick corner (four corners) keystone, lens shift, and the like.

The projection unit 410 may enlarge or reduce the image according to a distance (a projection distance) with the screen. The zoom function may be performed according to the distance from the screen. The zoom function may include a hardware method for controlling the size of a screen by moving the lens, and a software method for controlling the size of the screen by cropping the image. If the zoom function is performed, adjusting the focus of the image may be required. For example, the focus adjustment method includes a manual focus method, an electric method, and the like. The manual focus mode refers to a method of manually adjusting the focus, and the electric method refers that, when the zoom function is performed, the automatic focusing method is used to automatically adjust the focus using the built-in motor. When performing the zoom function, the projection unit 410 may provide a digital zoom function through software, and may provide an optical zoom function for performing a zoom function by moving the lens through the driving unit.

The projection unit 410 may perform a keystone function. If the height of the front projection is not matched, the screen may be distorted up or down. The keystone function refers to a function of correcting a distorted screen. For example, if a distortion is generated in the left and right directions of a screen, a horizontal keystone may be used for correction, and if a distortion is generated in a vertical direction, a vertical keystone may be used for correction. The quick corner (four corners) keystone function is the function of correcting the screen if the central area of the screen is normal but the balance of the edge area is not normal. The lens shift function is a function of moving the screen.

The projection unit 410 may automatically analyze the surrounding environment and the projection environment without user input to provide the zoom/keystone/focus function. Specifically, the projection unit 410 may automatically provide a zoom/keystone/focus function on the basis of the distance from the sound outputting apparatus 1 and the screen detected through the sensor (depth camera, distance sensor, infrared sensor, illumination sensor, etc.), information on a space where the sound outputting apparatus 1 is located, information on the amount of ambient light, and the like.

The projection unit 410 may provide a lighting function using a light source. In particular, the projection unit 410 may provide a lighting function by outputting a light using an LED. According to an embodiment, the projection unit 410 may include one LED, and the electronic apparatus may include a plurality of LEDs according to another embodiment. The projection unit 410 may output a light using a surface emitting LED according to an embodiment. The surface-emitting LED may mean an LED having a structure in which an optical sheet is disposed on an upper side of the LED such that the light is uniformly dispersed and output. When the light is output through the LED, the light may be evenly dispersed through the optical sheet, and the light dispersed through the optical sheet may be incident on the display panel.

The projection unit 410 may provide the user with a dimming function for adjusting the intensity of the light. When a user input for adjusting the intensity of a light is received from a user through the user interface 420 (e.g., the input module 50 such as a touch display button or dial), the projection unit 410 may control the LED to output the intensity of the light corresponding to the received user input. The projection unit 410 may provide a dimming function based on the content analyzed by the processor 20 without user input. The projection unit 410 may control the LED to output the intensity of the light based on information about the currently provided content (e.g., content type, content brightness, etc.).

The projection unit 410 may control the color temperature by the control of the processor 20. The processor 20 may control the color temperature based on the content. Specifically, if the content is identified to be output, the processor 20 may obtain color information for each frame of the content of which output is determined. The processor 20 may control the color temperature based on the obtained color information for each frame. The processor 20 may obtain at least one main color of the frame based on the color information for each frame. The processor 20 may adjust the color temperature based on the obtained at least one primary color. For example, the color temperature which the processor 20 may adjust may be divided into a warm type or a cold type. Here, it is assumed that a frame to be outputted (hereinafter referred to as an output frame) includes a scene in which fire occurs. The processor 20 may identify (or obtain) the primary color as red based on the color information included in the current output frame. The processor 20 may identify the color temperature corresponding to the identified primary color (red). The color temperature corresponding to red may be a warm type. The processor 20 may use an artificial intelligence (AI) model to obtain color information or a main color of the frame. According to an embodiment, the AI model may be stored in the sound outputting apparatus 1 (e.g., the memory 30). According to another embodiment, an artificial intelligence model may be stored in an external server that is capable of communicating with the sound outputting apparatus 1.

The sound outputting apparatus 1 may control the lighting function in association with an external device. Specifically, the sound outputting apparatus 1 may receive lighting information from an external device. The lighting illumination information may include at least one of brightness information or color temperature information set in an external device. The external device may refer to a device (e.g., IoT device included in the same home/company network) connected to the same network as the sound outputting apparatus 1 or a device (e.g., a remote control server) capable of communicating with an electronic apparatus which is not in the same network as the sound outputting apparatus 1 but is communicable with the electronic apparatus. For example, it is assumed that the external lighting device included in the same network as the sound outputting apparatus 1 outputs the red light in the brightness of 50. An external lighting device may directly or indirectly transmit illumination information (e.g., information indicating that red illumination is being output with brightness of 50). The sound outputting apparatus 1 may control the output of the light source based on the illumination information received from the external lighting device. For example, if the illumination information received from the external lighting device includes information outputting the red light with the brightness of 50, the sound outputting apparatus 1 may output the red light with the brightness of 50.

The sound outputting apparatus 1 may control the lighting function based on the biometric information. The processor 20 may obtain biometric information of the user. Here, the biometric information may include at least one of a user's body temperature, heart rate, blood pressure, respiration, or electrocardiogram. The biometric information may include various information other than the above-described information. For example, the electronic apparatus may include a sensor for measuring biometric information. The processor 20 may obtain biometric information of the user through the sensor, and may control the output of the light source based on the obtained biometric information. As another example, the processor 20 may receive biometric information from an external device via the input/output interface 430. The external device may refer to a user's portable communication device (e.g., a smartphone or a wearable device). The processor 20 may obtain biometric information of a user from an external device, and may control output of the light source based on the obtained biometric information. According to an implementation example, the electronic apparatus may identify whether the user is sleeping, and when the user is identified as sleeping (or in preparation of sleeping), the processor 20 may control the output of the light source based on the user's biometric information.

The memory 30 may store at least one command relating to the sound outputting apparatus 1. An operating system (OS) for driving the sound outputting apparatus 1 may be stored in the memory 30. Various software programs or applications may be stored in the memory 30 for operating the sound outputting apparatus 1 according to various embodiments of the disclosure. The memory 30 may include a semiconductor memory such as a flash memory or a magnetic storage medium such as a hard disk.

In detail, various software modules may be stored in the memory 30 to operate the sound outputting apparatus 1 according to various embodiments of the disclosure, and the processor 20 may execute various software modules stored in the memory 30 to control the operation of the sound outputting apparatus 1. The memory 30 may be accessed by the processor 20, and read/write/modify/update of data by the processor 20 may be performed.

In the disclosure, the term "memory" may be used in a sense that includes the memory 30, a ROM (not shown) in the processor 20, a RAM (not shown), or a memory card (not shown) (e.g., a micro SD, a memory stick) mounted on the sound outputting apparatus 1.

The user interface 420 may include various types of input devices. For example, the user interface 420 may include a physical button. The physical button may include an input module 50, such as a function key, a direction key (e.g., a four-way key) or a dial button. According to one embodiment, the physical button may be implemented with a plurality of keys. According to another embodiment, the physical button may be implemented with one key. Here, when the physical button is implemented as a single key, the sound outputting apparatus 1 may receive a user input in which one key is pressed for more than a threshold time. If a user input in which one key is pressed for more than a threshold time is received, the processor 20 may perform a function corresponding to the user input. For example, the processor 20 may provide a lighting function based on user input.

The user interface 420 may receive a user input using a non-contact method. If a user input is received through the contact scheme, a physical force must be delivered to the electronic apparatus. Thus, a method for controlling an electronic apparatus regardless of physical forces may be required. The user interface 420 may receive a user gesture and perform an operation corresponding to the received user gesture. The user interface 420 may receive a gesture of the user through a sensor (e.g., an image sensor or an infrared sensor).

The user interface 420 may receive a user input using a touch method. For example, the user interface 420 may receive user input via the touch sensor. According to an embodiment, the touch method may be implemented in a non-contact manner. For example, the touch sensor may identify whether the user's body has accessed within a threshold distance. The touch sensor may identify a user input even when a user does not contact the touch sensor. According to another implementation example, the touch sensor may identify a user input in which the user touches the touch sensor.

The sound outputting apparatus 1 may receive a user input in various ways other than the user interface described above. According to one embodiment, the sound outputting apparatus 1 may receive a user input via an external remote control device. The external remote control device may be a remote control device (e.g., an electronic apparatus dedicated control device) or a user's portable communication device (e.g., a smartphone or a wearable device) corresponding to the sound outputting apparatus 1. Here, the portable communication device of the user may store an application for controlling the electronic apparatus. The portable communication device may obtain a user input through the stored application and transmit the obtained user input to the sound outputting apparatus 1. The sound outputting apparatus 1 may receive a user input from the portable communication device and perform an operation corresponding to a control command of the user.

The sound outputting apparatus 1 may receive a user input using voice recognition. According to an embodiment, the sound outputting apparatus 1 may receive a user voice through a microphone included in the electronic apparatus. According to another embodiment, the sound outputting apparatus 1 may receive user voice from a microphone of an external device. Specifically, the external device may obtain a user voice through a microphone of the external device, and transmit the obtained user voice to the sound outputting apparatus 1. The user voice transmitted from the external device may be audio data or digital data which is obtained by converting the audio data (e.g., audio data converted to a frequency domain, etc.). Here, the sound outputting apparatus 1 may perform an operation corresponding to the received user voice. The sound outputting apparatus 1 may receive audio data corresponding to user voice through a microphone. The sound outputting apparatus 1 may convert the received audio data into digital data. The sound outputting apparatus 1 may convert the converted digital data into text data using a speech-to-text interpolation (STT) function. In accordance with an embodiment, a speech-to-text (STT) function may be performed directly by the sound outputting apparatus 1.

In accordance with another embodiment, the STT function may be performed by an external server. The sound outputting apparatus 1 may transmit digital data to an external server. The external server may convert the digital data into text data and obtain control command data based on the converted text data. The external server may transmit control command data (here, text data may be included) to the sound outputting apparatus 1. The sound outputting apparatus 1 may perform an operation corresponding to the user voice based on the obtained control command data.

The sound outputting apparatus 1 may provide a voice recognition function using one assistance (or AI assistant, e.g., Bixby™, etc.), but it is merely an embodiment and may provide a voice recognition function through a plurality of algorithms. At this time, the sound outputting apparatus 1 may select one of a plurality of assistances based on a trigger word corresponding to the assistance or a specific key existing in the remote controller to provide a voice recognition function.

The sound outputting apparatus 1 may receive a user input using a screen interaction. The screen interaction may mean a function of identifying whether a predetermined event occurs through an image projected onto a screen (or projection surface) and obtaining a user input based on the predetermined event. Here, the predetermined event may mean an event in which a predetermined object is identified at a particular location (e.g., a location where the UI for receiving a user input is projected). The predetermined object may include at least one of a body portion (e.g., a finger), an indication rod, or a laser point of the user. When a predetermined object is identified in a position corresponding to the projected UI, the sound outputting apparatus 1 may identify that a user input for selecting the projected UI is received. For example, the sound outputting apparatus 1 may project a guide image to display the UI on the screen. The sound outputting apparatus 1 may identify whether a user selects a projected UI. Specifically, the sound outputting apparatus 1 may identify that the user has selected the projected UI when the predetermined event is identified at the location of the projected UI. The projected UI may include at least one item. The sound outputting apparatus 1 may perform spatial analysis to identify whether a predetermined event is in a position of the projected UI. The sound outputting apparatus 1 may perform spatial analysis through a sensor (e.g., an image sensor, an infrared sensor, a depth camera, a distance sensor, etc.). The sound outputting apparatus 1 may identify whether a predetermined event occurs at a particular location (where the UI is projected) by performing spatial analysis. If a predetermined event occurs at a specific location (the location where the UI is projected), the sound outputting apparatus 1 may identify that a user input for selecting a UI corresponding to a specific location is received.

The I/O interface 430 is configured to input and output at least one of an audio signal and a video signal. The I/O interface 430 may receive at least one of audio and video signals from an external device and may output a control command to an external device.

The I/O interface 430 according to an embodiment may be implemented as at least one of a High Definition Multimedia Interface (HDMI), a Mobile High-Definition Link (MHL), a Universal Serial Bus (USB), a USB C-type, a display port (DP), Thunderbolt, a Video Graphics Array (VGA) port, an RGB Port, a Dsubminiature (D-SUB), or a Digital Visual Interface (DVI). According to an embodiment, the wired input/output interface may be implemented as an interface for inputting and outputting only an audio signal and an interface for inputting and outputting only an image signal, or may be implemented as one interface for inputting and outputting audio signals and video signals.

The sound outputting apparatus 1 may receive data through a wired input/output interface, but this is merely an embodiment, and may be supplied with power through a wired input/output interface. For example, the sound outputting apparatus 1 may receive power from an external battery through a USB C-type and may receive power from an outlet through a power adapter. As another example, the electronic apparatus may receive power from an external device (e.g., laptop or monitor, etc.) via the DP.

Meanwhile, according to an embodiment, the I/O interface 430 may be implemented as a wireless input/output interface including a communication module 90 for performing communication in at least one of a communication scheme of Wi-Fi, Wi-Fi direct, Bluetooth, Zigbee, 3rd generation (3G), 3rd Generation Partnership Project (3GPP), and Long Term Evolution (LTE). According to an embodiment, the wireless input/output interface may be implemented as an interface for inputting and outputting only an audio signal and an interface for inputting and outputting only a video signal, or may be implemented as one interface for inputting and outputting audio signals and video signals.

The audio signal may be input through a wired input/output interface, and the video signal may be input through a wireless input/output interface. Alternatively, the audio signal may be input through a wireless input/output interface, and the video signal may be input through a wired input/output interface.

The audio module 70 outputs an audio signal. In particular, the audio module 70 may include an audio output mixer, an audio signal processor, and an acoustic output module. The audio output mixer may mix the plurality of audio signals to be output as at least one audio signal. For example, the audio output mixer may mix the analog audio signal and the other analog audio signal (e.g., the analog audio signal received from the outside) into at least one analog audio signal. The sound output module may include a speaker or an output terminal. According to an embodiment, the sound outputting module may include a plurality of speakers, and in this case, the sound outputting module may be disposed inside the body, and the sound emitted from at least a portion of the vibration plate of the sound outputting module by hiding at least a portion may pass through a waveguide and transmit the sound to the outside of the body. The sound outputting module may include a plurality of sound outputting units, and a plurality of sound outputting units are symmetrically disposed on the exterior of the body such that sound may be emitted in all directions, i.e., in 360 degrees.

The power supply unit 440 may receive power from the outside and supply power to various configurations of the sound outputting apparatus 1. The power supply unit 440 according to an embodiment may be supplied with power through various methods. In one embodiment, the power supply unit 440 may be powered using the connector 330 as shown in FIG. 10. In addition, the power supply unit 440 may receive power using the DC power source code of 220V. The embodiment is not limited thereto and the electronic apparatus may be powered by using a USB power source code or may be powered by using a wireless charging method.

The power supply unit 440 may receive power using an internal battery or an external battery. The power supply unit 440 according to an embodiment may receive power through an internal battery. For example, the power supply unit 440 may charge power of the internal battery using at least one of a DC power source code of 220V, a USB power source code, and a USB C-Type power source code, and may receive power through the charged internal battery. The power supply unit 440 according to an embodiment may receive power through an external battery. For example, when a connection of an electronic apparatus and an external battery is performed through various wired communication methods such as a USB power source code, a USB C-Type power source code, a socket groove, and the like, the power supply unit 440 may receive power through an external battery. The power supply unit 440 may receive power directly from the external battery, charge the internal battery through the external battery, and receive power from the charged internal battery.

The power unit 440 according to an embodiment may receive power using at least one of the plurality of power supply methods.

With respect to power consumption, the sound outputting apparatus 1 may have power consumption of less than or equal to a predetermined value (e.g., 43 W) for socket type and other standards. At this time, the sound outputting apparatus 1 may vary the power consumption to reduce power consumption when using the battery. The sound outputting apparatus 1 may vary power consumption based on a power supply method and a power consumption.

The sound outputting apparatus 1 according to an embodiment may provide various smart functions.

Specifically, the sound outputting apparatus 1 may be connected to a portable terminal device for controlling the sound outputting apparatus 1, and the screen output from the sound outputting apparatus 1 may be controlled through a user input inputted from the portable terminal device. For example, the portable terminal device may be implemented as a smartphone including a touch display, and the sound outputting apparatus 1 may receive and output screen data provided by the portable terminal device from the portable terminal device, and control the screen output from the sound outputting apparatus 1 according to the user input inputted from the portable terminal device.

The sound outputting apparatus 1 may be connected to the portable terminal through various communication methods such as Miracast, Airplay, Wireless DEX, Remote PC, etc. to share content or music provided by the portable terminal device.

The portable terminal device and the sound outputting apparatus 1 may be connected in various ways. According to an embodiment, it is possible to perform a wireless connection by searching a sound outputting apparatus 1 in a portable terminal device, or searching a portable terminal device in the sound outputting apparatus 1 to perform a wireless connection. The sound outputting apparatus 1 may output content provided by the portable terminal device.

According to an embodiment, when a portable terminal device is located near the electronic apparatus while a specific content or music is being output in the portable terminal device, a preset gesture is detected through the display of the portable terminal device (e.g., a motion tap view), and the sound outputting apparatus 1 may output content or music being output in the portable terminal device.

According to an embodiment, when a specific content or music is being output in the portable terminal device, if the portable terminal device is brought closer to or below a predetermined distance from the sound outputting apparatus 1 (e.g., a non-contact tap view), or when the portable terminal device is in contact with the sound outputting apparatus 1 at a short interval (e.g., a contact tap view), the sound outputting apparatus 1 may output content or music being output in the portable terminal device.

Although the same screen as the screen provided in the portable terminal device is provided in the sound outputting apparatus 1, the disclosure is not limited thereto. That is, when a connection between the portable terminal device and the sound outputting apparatus 1 is established, the portable terminal device may output a first screen provided by the portable terminal device, and the sound outputting apparatus 1 may output a second screen provided by the portable terminal device different from the first screen. For example, the first screen may be a screen provided by a first application installed in the portable terminal device, and the second screen may be a screen provided by a second application installed in the portable terminal device. For example, the first screen and the second screen may be different screens provided by one application installed in the portable terminal device. In one example, the first screen may be a screen including a remote control type UI for controlling a second screen.

The sound outputting apparatus 1 according to embodiments of the disclosure may output a standby screen. For example, if the sound outputting apparatus 1 is not connected to an external device or there is no input received for a predetermined period of time from an external device, the sound outputting apparatus 1 may output a standby screen. The condition for the sound outputting apparatus 1 outputting a standby screen is not limited thereto and a standby screen may be output according to various conditions.

The sound outputting apparatus 1 may output a standby screen in the form of a blue screen, but embodiments are not limited thereto. For example, the sound outputting apparatus 1 may extract only a form of a specific object from data received from an external device, obtain an atypical object, and output a standby screen including the obtained atypical object.

Figure 13:
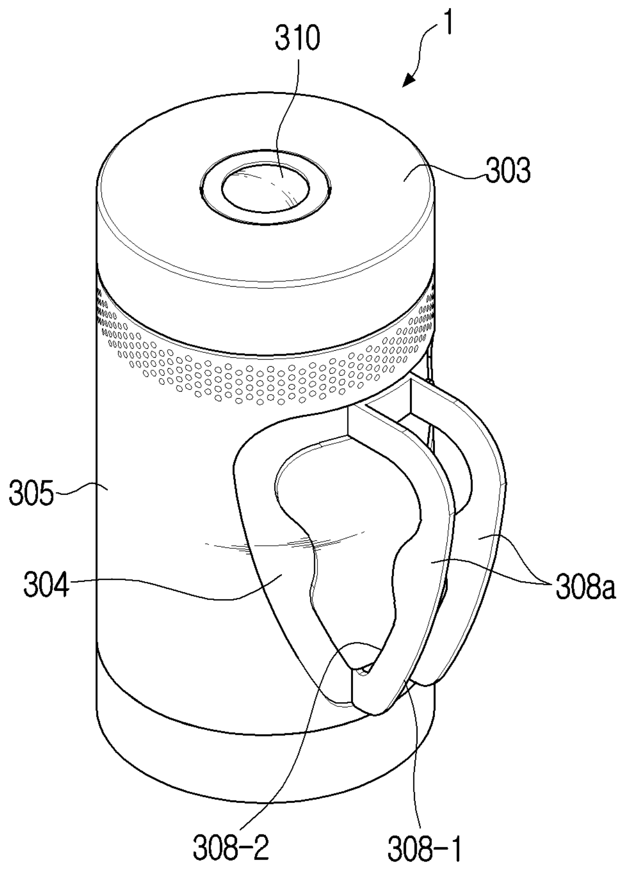
FIG. 13 is a perspective view illustrating the exterior of a sound outputting apparatus according to an embodiment of the disclosure.

FIG. 13 is a perspective view illustrating the exterior of the sound outputting apparatus 1, according to another embodiment. Referring to FIG. 13, the sound outputting apparatus 1 may include a support (or "handle") 308*a*.

The support 308*a* of various embodiments may be a handle or ring provided for the user to grip or move the sound outputting apparatus 1, or the support 308*a* may be a stand that supports the main body 305 in a state in which the main body 305 is laterally lying.

As shown in FIG. 13, the support 308*a* may be connected to the outer circumferential surface of the main body 305 by a hinge structure, and may be selectively separated and fixed on the outer circumferential surface of the main body 305 according to the user's needs. The number, shape, or arrangement structure of the support 308*a* may be variously implemented without limitation. Although not shown in the drawings, the support 308*a* may be embedded in the main body 305 to be used by a user as needed, or the support 308*a* may be implemented as a separate accessory to be attachable to and detachable from the sound outputting apparatus 1.

The support 308*a* may include a first support surface 308*a*-1 and a second support surface 308*a*-2. The first support surface 308*a*-1 may be a surface facing away from the main body 305 while the support 308*a* is separated from the outer circumferential surface of the main body 305, and the second support surface 308*a*-2 may be a surface facing toward the main body 305 while the support 308*a* is separated from the outer circumferential surface of the main body 305.

The first support surface 308*a*-1 may extend from the lower portion of the main body 305 to the upper portion of the main body 305 and may be away from the main body 305, and the first support surface 308*a*-1 may have a flat or uniformly curved shape. The first support surface 308*a*-1 may support the main body 305 when the sound outputting apparatus 1 is mounted such that the outer surface of the main body 305 comes into contact with a bottom surface, that is, when the projection lens 310 is disposed to face the front direction. In an embodiment including two or more of the support 308*a*, the angle of the head 303 and the projection lens 310 may be adjusted by adjusting the interval of the two or more of the support 308 or the hinge-opened angle.

The second support surface 308*a*-2 is a surface that contacts a user or an external holding structure when the support 308*a* is supported by an external holding structure and may have a shape corresponding to a gripping structure or an external holding structure of a user's hand so as not to slide when the support 308*a* is supported by a user or an external holding structure, or when the sound outputting apparatus 1 is supported or moved. The user may move the projection lens 310 in the front direction to fix the head 303, hold the support 308*a*, move the sound outputting apparatus 1, and use the sound outputting apparatus 1, such as a flashlight.

The support groove 304 has a groove structure which is provided in the main body 305 and may be accommodated when the support 308*a* is not used, and as illustrated in FIG. 13, the support groove 304 may be implemented as a groove structure corresponding to the shape of the support 308*a* on the outer circumferential surface of the main body 305. When the support 308*a* is not used, the support 308*a* may be stored in the support groove 304, and the outer circumferential surface of the body main 305 may be smoothly maintained.

In the situation where the support 308*a* is stored in the main body 305 and the support 308*a* is needed, the support 308*a* may have a structure of being withdrawn to the outside of the main body 305. In this example, the support groove 304 may have a structure inserted into the main body 305 to receive the support 308*a*, and the second support surface 308*a*-2 may include a door (not shown) that is in close contact with the outer circumferential surface of the main body 305 or opens and closes the support groove 304.

The sound outputting apparatus 1 may include various types of accessories that help to use or store the sound outputting apparatus 1, and for example, the sound outputting apparatus 1 may include a protective case (not shown) to protect the sound outputting apparatus 1 and to be easily transported, or a bracket (not shown) coupled to a tripod (not shown) or an outer surface for supporting or fixing the main body 305 to fix the sound outputting apparatus 1.

Figure 14:
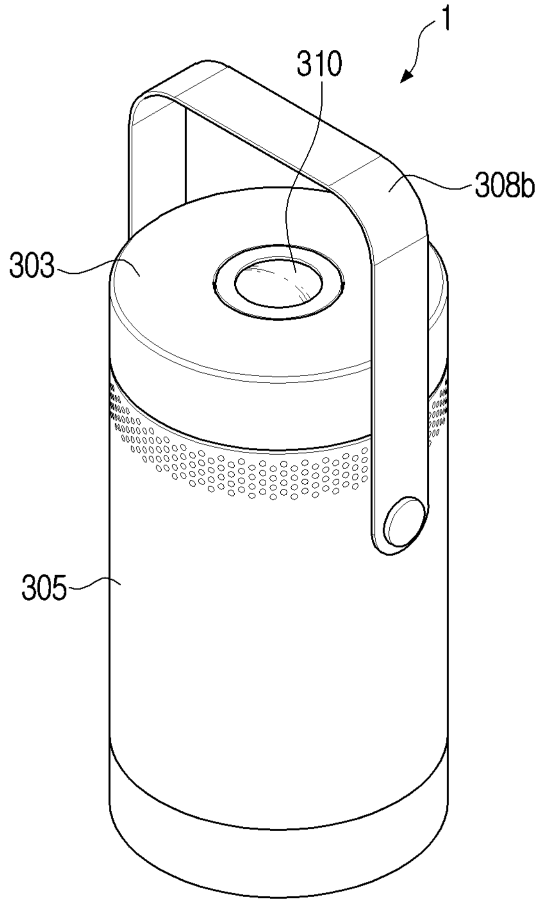
FIG. 14 is a perspective view illustrating the exterior of a sound outputting apparatus, according to an embodiment of the disclosure.

FIG. 14 is a perspective view illustrating the exterior of the sound outputting apparatus 1, according to other embodiments of the disclosure. Referring to FIG. 14, the sound outputting apparatus 1 may include a support (or "handle") 308*b*.

The support 308*b* of the various embodiments may be a handle or a ring provided for the user to grip or move the sound outputting apparatus 1, or the support 308*b* may be a stand that supports the main body 305 to be oriented at an arbitrary angle while the main body 305 is lying in the lateral direction.

As shown in FIG. 14, the support 308*b* may be connected to the main body 305 at a predetermined point (e.g., ⅔ to ¾ of the height of the main body 305) of the main body 305. When the support 308 is rotated in the direction of the main body 305, the main body 305 may be supported so that the main body 305 is oriented at an arbitrary angle while the main body 305 is lying in the lateral direction.

Figure 15:
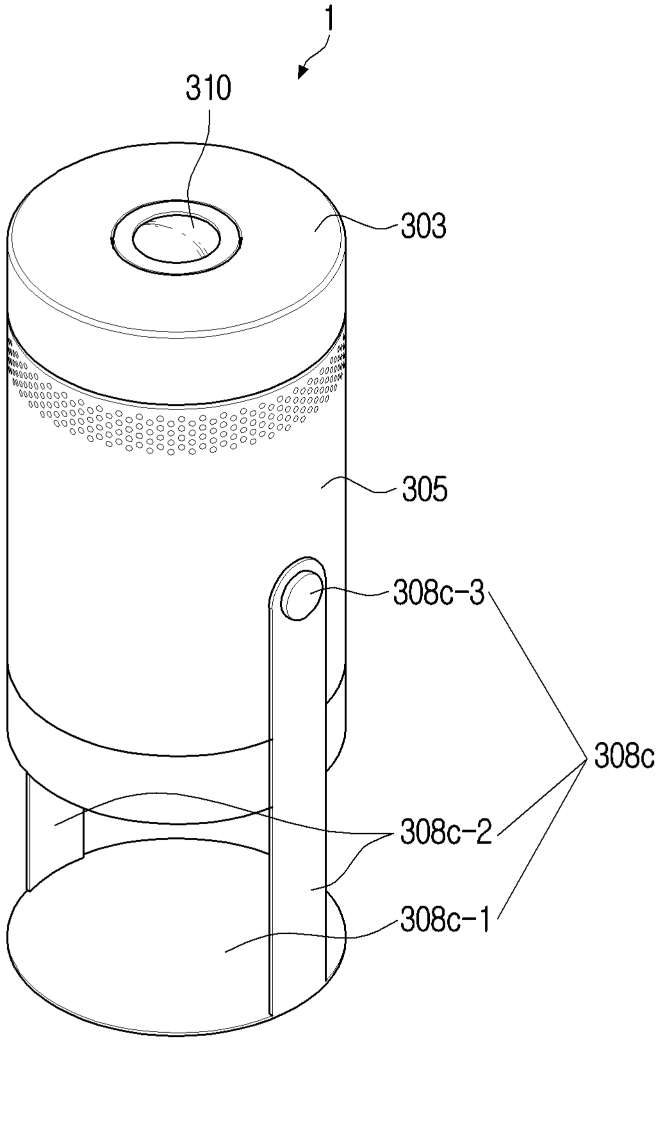
FIG. 15 is a perspective view illustrating the exterior of a sound outputting apparatus according to another embodiment of the disclosure.

FIG. 15 is a perspective view illustrating the appearance of a sound outputting apparatus 1 according to another embodiment of the disclosure.

Referring to FIG. 15, the sound outputting apparatus 1 may include a support (or a "pedestal") 308*c*. The support 308*c* of various embodiments may include a base plate 308*c*-1 provided to support the sound outputting apparatus 1 on the ground, and two support members 308*c*-2 connecting the base plate 308-*c* and the main body 305.

According to an embodiment, the height of two support members 308*c*-2 may be the same, and each of one cross-section of the two support members 308*c*-2 may be coupled or separated by a groove and hinge members 308*c*-3 provided in one outer circumferential surface of the main body 305.

The two support members 308*c*-2 may be hinge-connected to the main body 305 at a predetermined point (e.g., one-third to two-fourth points of the height of the body) of the main body 305.

When the two support members 308*c*-2 and the main body 305 are coupled by the hinge members 308*c*-3, the main body 305 may be rotated around a virtual horizontal axis formed by the two hinge members 308*c*-3, so that the projection angle of the projection lens 310 may be adjusted.

Figure 16:
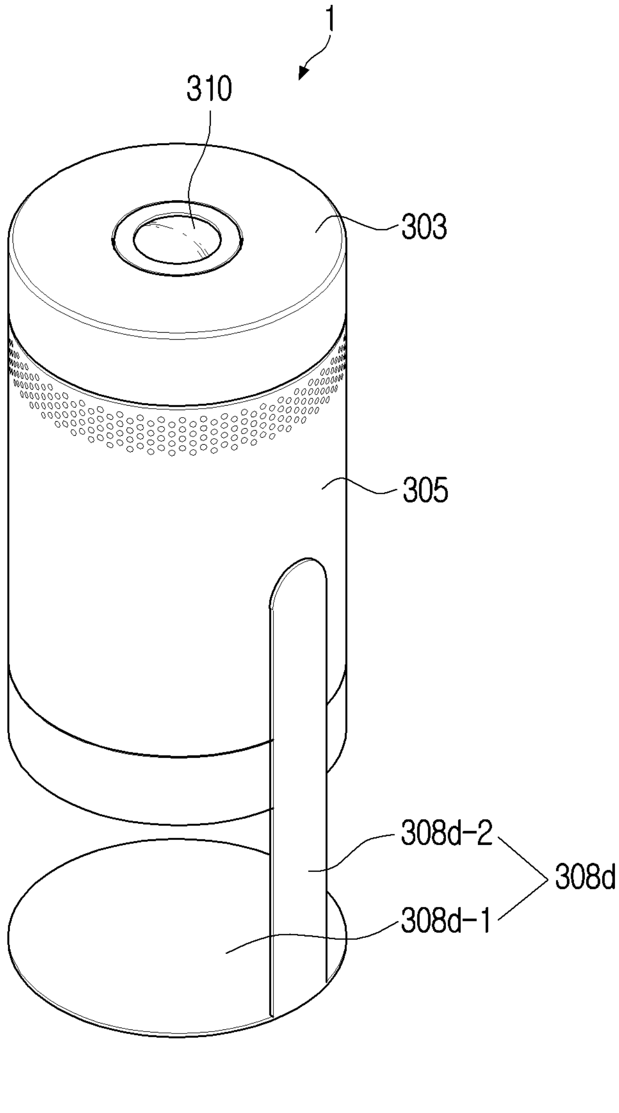
FIG. 16 is a perspective view illustrating the exterior of a sound outputting apparatus according to another embodiment of the disclosure.
Figure 17:
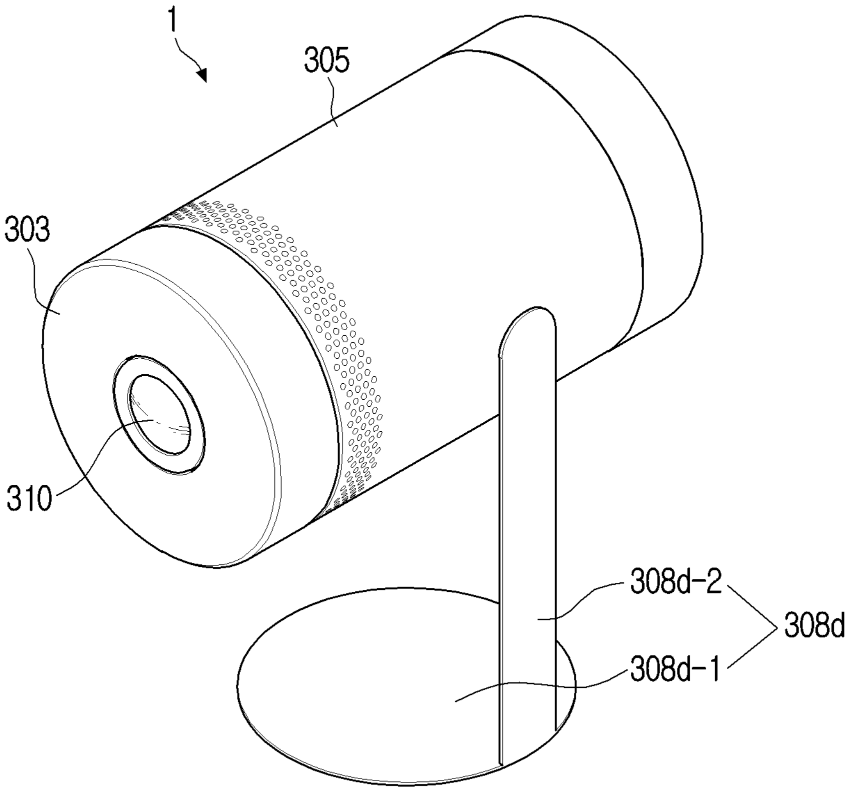
FIG. 17 is a perspective view illustrating a state in which the sound outputting apparatus of FIG. 16 is rotated.

Although two support members 308C-2 are connected to the main body 305 in FIG. 15, the disclosure is not limited thereto, and as shown in FIGS. 16 and 17, one support member and the main body 305 may be connected by one hinge member.

FIG. 16 is a perspective view illustrating the appearance of a sound outputting apparatus 1 according to another embodiment of the disclosure.

FIG. 17 is a perspective view illustrating a state in which the sound outputting apparatus 1 of FIG. 16 is rotated.

Referring to FIGS. 16 and 17, a support 308*d* of various embodiments may include a base plate 308*d*-1 provided to support the sound outputting apparatus 1 on the ground, and one support member 308*d*-2 connecting the base plate 308*d*-1 and the main body 305.

The cross section of one support member 308*d*-2 may be coupled or separated by a groove provided on one outer circumferential surface of the main body 305 and a hinge member (not shown).

When one support member 308*d*-2 and the main body 305 are coupled by one hinge member (not shown), the main body 305 may be rotated based on a virtual horizontal axis formed by one hinge member (not shown) as shown in FIG. 17.

The supports shown in FIGS. 13, 14, 15, 16, and 17 are merely an example, and it is understood that the sound outputting apparatus 1 according to embodiment may have a support in various positions or shapes.

While non-limiting example embodiments of the disclosure have been shown and described, the disclosure is not limited to the aforementioned example embodiments, and it is apparent that various modifications may be made by those having ordinary skill in the technical field to which the disclosure belongs, without departing from the scope of the disclosure

What is claimed is:

1. A sound outputting apparatus comprising:

a base;

a plurality of speakers configured to output sound; and a cover coupled to the base, the cover comprising a plurality of guide flow paths that respectively correspond to the plurality of speakers, wherein each of the plurality of guide flow paths comprises:

an outer hole that is above the plurality of speakers in a first direction and is opened in a second direction different from the first direction, and the outer hole extends away from the base from a respective one of the plurality of speakers in the second direction; and a groove that is above the plurality of speakers in the first direction and that extends toward a center of the base from the respective one of the plurality of speakers in a third direction that is different from the first direction and the second direction, and wherein each guide flow path, from among the plurality of guide flow paths, is configured to guide the output sound from the respective one of the plurality of speakers by dividing the output sound into the outer hole of the guide flow path and the groove of the guide flow path.

2. The sound outputting apparatus of claim 1, wherein at least one of the plurality of guide flow paths extends from an inner side of the base toward an outer side of the base.

3. The sound outputting apparatus of claim 2, wherein a cross section of the at least one of the plurality of guide flow paths increases toward the outer side of the base.

4. The sound outputting apparatus of claim 3, wherein the cross section of the at least one of the plurality of guide flow paths increases at an increasing rate from the inner side of the base toward the outer side of the base, such that the at least one of the plurality of guide flow paths has a horn shape.

5. The sound outputting apparatus of claim 3, wherein the cross section of the at least one of the plurality of guide flow paths increases at an decreasing rate from the inner side of the base toward the outer side of the base, such that the at least one of the plurality of guide flow paths has an inverse-horn shape.

6. The sound outputting apparatus of claim 1, wherein each of the plurality of guide flow paths has a same structure.

7. The sound outputting apparatus of claim 1, wherein the groove comprises at least one inner hole which is opened so as to be configured to transfer a portion of the output sound that is guided to the groove to an outside of the guide flow path that comprises the groove.

8. The sound outputting apparatus of claim 7, wherein the at least one inner hole comprises an inner hole that is opened downward so as to be configured to guide at least a part of the portion of the output sound in a fourth direction, opposite of the first direction, toward the base.

9. The sound outputting apparatus of claim 7, wherein the at least one inner hole comprises an inner hole that is opened upward in the first direction so as to be configured to guide at least a part of the portion of the output sound to an upper portion of the cover.

10. The sound outputting apparatus of claim 7, wherein the at least one inner hole is a plurality of inner holes formed in the groove.

11. The sound outputting apparatus of claim 1, wherein at least one of the plurality of guide flow paths comprises a soundproof module disposed inside the groove of the at least one of the plurality of guide flow paths.

12. The sound outputting apparatus of claim 1, wherein at least one of the plurality of guide flow paths comprises a noise cancellation device disposed inside the groove of the at least one of the plurality of guide flow paths.

13. The sound outputting apparatus of claim 1, wherein the groove of a first guide flow path, among the plurality of guide flow paths, comprises an inner hole that is configured to guide a portion of the output sound, from a first speaker among the plurality of speakers, that is guided toward the center of the base to the groove of a second guide flow path among the plurality of guide flow paths.

14. The sound outputting apparatus of claim 13, further comprising:

a phase conversion module, provided between the first guide flow path and the second guide flow path, configured to convert the portion of the output sound guided toward the center of the base to an inverse phase.

15. The sound outputting apparatus of claim 13, wherein the first guide flow path and the second guide flow path are symmetrical to each other with respect to the center of the base.

16. A sound outputting apparatus comprising:

a base;

at least one speaker configured to output sound, the at least one speaker provided on an end of the base in a first direction that coincides with a center axis of the base; and a cover that is coupled to the end of the base, the at least one speaker between the base and the cover in the first direction, the cover defining at least one guide flow path that respectively corresponds to the at least one speaker, wherein each of the at least one guide flow path comprises:

an outer hole that is above the at least one speaker in the first direction and is opened in a second direction, that is perpendicular to the first direction, and the outer hole extends away from the center axis of the base from a respective one of the at least one speaker in the second direction, and a groove that is above the at least one speaker in the first direction and that extends toward the center axis of the base from the respective one of the at least one speaker in a third direction, that is perpendicular to the first direction and different from the second direction, and wherein each guide flow path, from among the at least one guide flow path, is configured to guide the output sound from the respective one of the at least one speaker by dividing the output sound into the outer hole of the guide flow path and the groove of the guide flow path.

17. The sound outputting apparatus of claim 16, wherein the at least one speaker is a plurality of speakers and the at least one guide flow path is a plurality of guide flow paths, the plurality of speakers are arranged symmetrically around the center axis of the base, and the plurality of guide flow paths are arranged symmetrically around the center axis of the base.

18. The sound outputting apparatus of claim 16, wherein the at least one guide flow path extends in the second direction and the third direction, from a position directly above the at least one speaker in the first direction.

19. The sound outputting apparatus of claim 18, wherein a cross section of the at least one guide flow path increases in the second direction that extends away from the center axis of the base.

20. The sound outputting apparatus of claim 16, wherein the groove comprises at least one inner hole which is opened so as to be configured to transfer a portion of the output sound that is guided to the groove to an outside of the guide flow path that comprises the groove.

* * * * *